US012607490B1

(12) United States Patent
Shalaby et al.

(10) Patent No.: US 12,607,490 B1
(45) Date of Patent: Apr. 21, 2026

(54) SYSTEM AND METHOD FOR MONITORING MULTIPHASE FLUID FLOW

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/261,700

(22) Filed: Jul. 7, 2025

(51) Int. Cl.
    G01F 1/663 (2022.01)
    G01F 1/74 (2006.01)

(52) U.S. Cl.
    CPC ................ G01F 1/663 (2013.01); G01F 1/74 (2013.01)

(58) Field of Classification Search
    CPC .................................. G01F 1/663; G01F 1/74
    See application file for complete search history.

(56) References Cited

U.S. PATENT DOCUMENTS 4,902,961 A    2/1990  De et al.
5,485,743 A  *  1/1996  Taherian ................ G01N 22/00
                                                        324/637

2010/0148804 A1*  6/2010  Jakoby ................ G01N 27/221
                                                        73/861.08
2011/0196625 A1*  8/2011  Sheila-Vadde ......... G01F 1/662
                                                        702/49
2011/0267074 A1   11/2011  Xie et al.
2018/0113082 A1   4/2018  Nyfors

FOREIGN PATENT DOCUMENTS

CN          115290679          11/2022

OTHER PUBLICATIONS

Muhammad TAYYAB, et al. "A Radio Frequency Sensor Array for Dielectric Constant Estimation of Multiphase Oil Flow in Pipelines", IEEE Sensors Journal, vol. 17, Issue 18, Jul. 26, 2017, pp. 5900-5907, 8 pages.

* cited by examiner

*Primary Examiner* — Timothy P Graves
(74) *Attorney, Agent, or Firm* — Oblon, McClelland, Maier & Neustadt, L.L.P.

(57) ABSTRACT

A system and method for monitoring multiphase fluid flow includes a pipe section. The system further includes a plurality of patch antennas including pairs of transmitting antennas and receiving antennas integrated on an exterior surface of the pipe section, each patch antenna having a ground plane. The system further includes an electromagnetic wave generator connected to the patch antennas. The system further includes a phase detector connected to the patch antennas. The system further includes a processing unit configured to determine a relative proportion of constituents in a multiphase fluid flowing through the pipe section based on phase shifts measured by the phase detector.

14 Claims, 10 Drawing Sheets

600

SYSTEM AND METHOD FOR MONITORING MULTIPHASE FLUID FLOW

BACKGROUND

Technical Field

The present disclosure is directed to industrial measurement and monitoring technologies, and more particularly to a system and a method for monitoring multiphase fluid flow in real-time.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Capacitive sensing technologies have become increasingly important in industrial process monitoring, particularly in applications involving multiphase flow, fluidized beds, and dielectric property estimation. Among these, electrical capacitance tomography (ECT) has emerged as a non-invasive and cost-effective imaging technique that enables the estimation of material distributions within pipelines or vessels. The ECT operates by measuring variations in permittivity across an array of electrodes positioned around a sensing region and reconstructing a permittivity distribution using computational algorithms. This facilitates real-time monitoring of flow regimes, solid concentrations, and gas-liquid interfaces, making it highly valuable in chemical, petrochemical, and energy industries.

With advancements in electronics, computational imaging, and sensor miniaturization, the ECT has evolved to offer improved image quality, portability, and operational adaptability. Despite these advancements, several technical challenges persist in making ECT systems more robust, accurate, and practical for a broader range of industrial applications. For example, the ECT relies on complex algorithms to reconstruct cross-sectional images, which are computationally intensive and time-consuming. Moreover, the ECT systems often struggle to provide accurate and timely results for fast-moving fluids, as capacitance measurements may not capture subtle variations in dielectric properties. Additionally, the complexity of the ECT systems and required computational resources make them costly to implement and maintain. In addition, the ECT focuses on reconstructing cross-sectional images of the flow, which may be unnecessary for applications where only a ratio of fluid constituents is required. Although the ECT systems perform optimally when there is a significant difference in dielectric constants of constituents of a mixture, many industrial processes involve gases whose dielectric constants are very similar and close to unity. This similarity makes it challenging for the ECT systems to accurately distinguish between different gas components.

Several conventional approaches have been explored to improve ECT design, performance, and deployment. For instance, portable ECT systems have been reviewed for use in hostile or mobile environments (See: Rashid, W. N. A., et al., "*Electrical Capacitance Tomography: A Review on Portable ECT System and Hardware Design*," Sensor Review, vol. 36, no. 1, pp. 64-70, 2016). These systems integrate wireless communication and cloud computing for enhanced flexibility, yet they continue to face limitations in terms of image reconstruction and system complexity.

Another conventional approach focused on the use of the ECT for particulate process measurements, assessing solid distributions and flow patterns in industrial reactors (See: Zhang, W., et al., "*Application of Electrical Capacitance Tomography in Particulate Process Measurement—A Review*," Advanced Powder Technology, 2014). However, this approach is susceptible to electrostatic noise and suffers from reduced accuracy when measuring high-speed or low-density flows.

In yet another conventional approach, the ECT has also been applied to monitor the circulating fluidized beds for clean coal combustion applications (See: Wang, H. & Yang, W., "*Application of Electrical Capacitance Tomography in Circulating Fluidised Beds—A Review*," Applied Thermal Engineering, 2020). These applications demand real-time, high-resolution imaging, which the ECT systems currently struggle to deliver due to the complex dynamics of gas-solid flow systems.

Additionally, a related approach outside the conventional ECT involves the use of radio-frequency (RF) sensor arrays for dielectric constant estimation of multiphase flow. In this approach, a sensor system employing a single transmitting antenna and 27 receiving antennas operating at 250 MHz was presented (See: Tayyab, M., Sharawi, M. S., & Al-Sarkhi, A., "*A Radio Frequency Sensor Array for Dielectric Constant Estimation of Multiphase Oil Flow in Pipelines,*" IEEE Sensors Journal, vol. 17, no. 18, pp. 5900-5907, 2017). While the system offered a novel frequency-domain approach, it suffered from poor signal-to-noise ratio (SNR) due to sub-optimal antenna design and heavy reliance on simulation-derived S-parameter mappings, which may not accurately reflect real-world behavior.

Each of the aforementioned approaches, while addressing specific aspects of capacitance-based and RF-based dielectric sensing, exhibits limitations such as poor sensitivity to low-dielectric media (e.g., gases), high dependence on complex reconstruction algorithms, poor SNR in fast-flowing systems, and difficulty in scaling for compact or embedded environments. Many of these systems also rely on simulation models or require complex electrode geometries, which hinders adaptability and practical deployment in diverse industrial contexts.

Accordingly, it is one object of the present disclosure to provide a simplified, high-speed, and low-complexity dielectric sensing system that is particularly effective for fast-moving gas flows and low-contrast dielectric measurements.

SUMMARY

In an exemplary embodiment, a system for monitoring multiphase fluid flow is disclosed. The system includes a pipe section. The system further includes a plurality of patch antennas including pairs of transmitting antennas and receiving antennas integrated on an exterior surface of the pipe section, each patch antenna having a ground plane. The system further includes an electromagnetic wave generator connected to the patch antennas. The system further includes a phase detector connected to the patch antennas. The system further includes a processing unit configured to determine a relative proportion of constituents in a multiphase fluid flowing through the pipe section based on phase shifts measured by the phase detector.

In another exemplary embodiment, a method for monitoring a multiphase fluid flow is disclosed. The method includes arranging a plurality of patch antennas around a circumference of a pipe section. The method further includes activating a pair of the patch antennas. The method further includes transmitting, with a transmitting antenna, an electromagnetic wave, by an electromagnetic wave generator connected to the transmitting antenna, through the multiphase fluid flow within the pipe section. The method further includes measuring a phase shift between a transmitted signal and a received signal. The method further includes determining a proportion of constituents in the multiphase fluid flow based on the measured phase shift.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
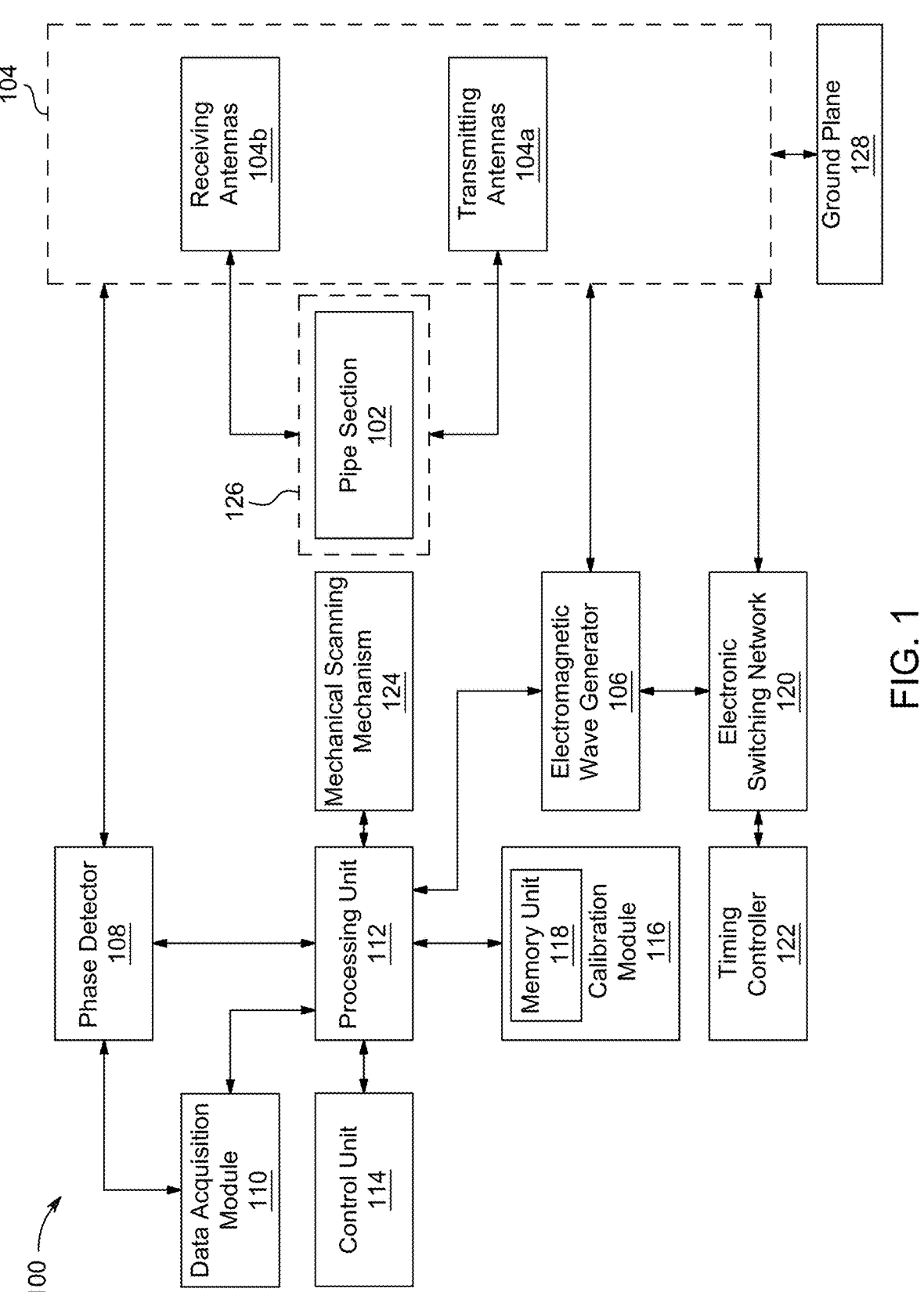
FIG. 1 illustrates a block diagram of a system for monitoring multiphase fluid flow, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a high-frequency, phase-based sensing system integrated with antennas for real-time monitoring of multiphase fluid flow in industrial pipelines. The present disclosure utilizes patch antennas arranged circumferentially around a pipe section to detect phase shifts in transmitted electromagnetic waves, which vary in response to dielectric properties of a flowing medium, such as the multiphase fluid flow. Conventional fluid monitoring systems often face limitations in response time, resolution, and adaptability when dealing with dynamic multiphase flows.

The present disclosure describes a system that operates in single and dual-frequency modes and incorporates high-speed electronic or mechanical scanning with phase-sensitive detection to enable accurate, real-time determination of fluid composition. By correlating the phase shift between transmitted and received signals with known dielectric constants of gas or liquid phases, the system achieves precise identification of constituent ratios of flowing fluids. The system enhances measurement accuracy, reduces latency, and supports integration into industrial environments, providing a robust solution for high-speed, multiphase flow diagnostics.

FIG. 1 illustrates a block diagram of a system 100 for monitoring multiphase fluid flow (not shown), according to certain embodiments. As used herein, the term "multiphase fluid flow" refers to concurrent movement of two or more immiscible or partially miscible fluid or solid phases (e.g., gas-liquid, liquid-liquid, gas-solid, or gas-liquid-solid) within a flow domain, such as a pipe or channel. Each phase may differ in density, viscosity and velocity, and flow behavior is influenced by an interaction between the phases and surrounding geometry. According to certain embodiments, the system 100 is optimized for real-time monitoring of high-speed multiphase fluid flow, ensuring accurate and timely measurements. Unlike traditional capacitance-based systems, which require longer integration times to achieve sufficient sensitivity, the system 100 utilizes rapid phase measurements, enabling faster response times. The system 100 is also designed with simplified architecture and processing logic, making the system 100 more cost-effective and computationally efficient compared to conventional electrical capacitance tomography (ECT) systems. Rather than reconstructing tomographic images, the system 100 is configured to focus on determining relative proportions (i.e., ratios) of constituents (e.g., oil, water, gas, steam, foam, and the like) in the multiphase fluid flow, which directly serves requirements of industrial applications where real-time composition monitoring is essential.

The system 100 includes a pipe section 102, patch antennas 104, an electromagnetic wave generator 106, a phase detector 108, a data acquisition module 110, a processing unit 112, a control unit 114, a calibration module 116, a memory unit 118, an electronic switching network 120, a timing controller 122 and a mechanical scanning mechanism 124.

The pipe section 102 is a cylindrical conduit designed to transport the multiphase fluid. In an embodiment, pipe section 102 may be composed of non-conductive material, such as, but not limited to, polymers, ceramics, glass, composites, and so forth. In another embodiment, the pipe section 102 may be composed of minimally conductive material, such as, but not limited to, carbon-loaded polymers, doped semiconductors, high-resistance alloys, and so forth. In yet another embodiment, pipe section 102 may be composed of conductive material, such as, but not limited to, metal alloys, metals, conductive coatings, and so forth. The material of the pipe section 102 may be selected to ensure minimal attenuation or distortion of transmitted signals as they pass through the pipe section 102 and interact with a fluid medium (i.e., multiphase fluid) inside the pipe section 102.

The pipe section 102 includes an exterior surface upon which the patch antennas 104 are affixed or integrated, either directly or via a supporting substrate. The supporting substrate is a dielectric material that physically supports antenna elements while also influencing the performance of the patch antennas 104 through its dielectric properties. As used herein, the term "dielectric properties" refers to electrical characteristics of a material (i.e., individual constituents of the multiphase fluid, such as gas, water, liquid hydrocarbons, and so forth) that determine its response to an applied electromagnetic field, particularly its ability to permit the propagation of electric fields. The dielectric properties include, but are not limited to, a dielectric constant (relative permittivity), loss tangent, and polarizability, which collectively influence a phase velocity, attenuation, and impedance of electromagnetic signals traveling through the fluid medium. The supporting substrate may be, but is not limited to, a printed circuit board (PCB), ceramic substrates, polyimide films, glass, and the like. The supporting substrate may be selected based on factors such as durability, the dielectric constant, temperature resistance, and compatibility with a patch antenna design.

The pipe section 102 also includes an interior surface that comes into direct contact with the multiphase fluid. The interior surface serves as a propagation interface for the transmitted signals (i.e., electromagnetic waves) that travel between the patch antennas 104.

In an embodiment, an internal diameter of the pipe section 102 may be selected based on an expected flow volume of the fluid medium and industrial application, ensuring compatibility with standard pipeline configurations. In some embodiments, the pipe section 102 may also include an attaching means for mounting additional components, such as mechanical scanning and electrical scanning components. The attaching means may include, but are not limited to, clamps, magnetic mounts, adhesive pads, and so forth. Embodiments of the present disclosure are intended to include or otherwise cover any type of the attaching means, including known related art and/or later developed technologies.

In an embodiment, the pipe section 102 may be designed to endure high pressures and temperatures that are commonly encountered in industries like chemical processing, petroleum, or utilities. In an embodiment, the pipe section 102 may be positioned so that it runs in the same direction as the multiphase fluid flow. This means that the multiphase fluid flows from one end of the pipe section 102 to other in a straight path (longitudinal direction), and the pipe section 102 is aligned with the corresponding multiphase fluid flow to ensure that a measurement system works properly along the path of the multiphase fluid flow. By aligning the pipe section 102 longitudinally with the multiphase fluid flow, the system 100 ensures that readings from each pair of the patch antennas 104 provide accurate, reliable data regarding properties of the multiphase fluid (e.g., phase shift or composition) since they are all measuring in the same direction along the flow path.

The patch antennas 104 (hereinafter collectively referred to as the patch antennas 104 and individually referred to as the patch antenna 104) may include multiple pairs of transmitting antennas 104a and receiving antennas 104b integrated on the exterior surface of the pipe section 102. In some embodiments, the patch antennas 104 are printed (using conductive ink or deposition techniques) onto the supporting substrate, such as a flexible substrate 126 that surrounds the pipe section 102, allowing for conformal installation on curved surfaces. The flexible substrate 126 may be a bendable material, such as a plastic film, polyimide, or other suitable material that wraps around the exterior surface of the pipe section 102. This configuration allows the patch antennas 104 to remain closely coupled to the pipe section 102, maintaining alignment and signal consistency, even on non-planar (curved) surfaces. In another embodiment, the patch antennas 104 may be placed as rigid pieces on the exterior surface of the pipe section 102. The patch antennas 104 are arranged in pairs around circumference of the pipe section 102, with each pair including a transmitting antenna 104a and a receiving antenna 104b. The receiving antenna 104b may be positioned on an opposite side of the pipe section 102 relative to the transmitting antenna 104a. In an exemplary embodiment, the pairs of patch antennas 104 may be placed at uniform azimuthal intervals around the circumference of the pipe section 102, such as every 45°, 60°, or 90°, depending on the number of patch antennas 104 employed. This arrangement ensures comprehensive electromagnetic coverage and enables high-resolution phase shift measurements (hereinafter, the phase shift measurements are interchangeably referred to as the phase shift values, phase shift data, phase shifts or phase shift) across a full cross-section of the multiphase fluid flow.

Each transmitting antenna 104a is configured to radiate electromagnetic waves across the pipe section 102, and the corresponding diametrically opposite receiving antenna 104b is configured to receive the radiated electromagnetic waves. This configuration facilitates accurate phase shift measurement as the electromagnetic waves pass through the multiphase fluid, enabling estimation of the relative proportion of the constituents based on dielectric variations. As used herein, the term "phase shift" refers to a difference in phase between two periodic electromagnetic waves, expressed in terms of time or angular displacement. In the context of the system 100, the phase shift refers to a change in the phase experienced by the transmitted electromagnetic wave as it propagates through the multiphase fluid. This alteration arises due to the varying dielectric properties of individual constituents within the multiphase fluid. As the electromagnetic wave interacts with the constituents of the multiphase fluid, its dielectric properties (i.e., velocity and propagation characteristics) are modulated accordingly. The receiving antenna 104b captures this altered electromagnetic wave, and the corresponding phase shift is measured. The measured phase shift serves as a key parameter for determining the relative proportion of the constituents in the multiphase fluid.

Also, as used herein, the term "dielectric variations" refers to spatial or temporal differences in the dielectric properties of the material, which influence how the electromagnetic waves propagate through the fluid medium. In the multiphase fluid, the dielectric variations are indicative of differing constituent ratios and material compositions.

In an embodiment, each patch antenna 104 includes a radiating patch (not shown), a dielectric substrate, and a ground plane 128, forming a compact and planar antenna structure suitable for integration onto cylindrical surfaces, such as the exterior surface of the pipe section 102. The radiating patch, made of the conductive material, emits or receives the electromagnetic waves generated by the electromagnetic wave generator 106. The dielectric substrate is an insulating layer between the radiating patch and the ground plane 128 that supports the structure and influences behavior of the patch antenna 104. The ground plane 128 is a conductive surface beneath the dielectric substrate that reflects the electromagnetic waves and shapes a radiation pattern. The ground plane 128 minimizes electromagnetic interference and enhances measurement accuracy. In an embodiment, the ground plane 128 may be implemented either directly on the exterior surface of the pipe section 102 or on the supporting substrate (i.e., flexible substrate 126) affixed to the pipe section 102.

In certain embodiments, the patch antennas 104 may be fabricated using microwave-compatible materials, such as copper for the radiating patch and the ground plane 128, and low-loss dielectric substrates such as Rogers (RT)/duroid, flame retardant 4 (FR4), ceramic-filled polytetrafluoroeth-ylene (PTFE) laminates, and so forth. The material of the patch antenna 104 may be selected based on application-specific requirements, such as temperature range, chemical resistance, and electromagnetic performance.

In an embodiment, the patch antennas 104 may be selected due to their compact form factor, ease of fabrication, directional radiation characteristics, and compatibility with high-frequency operations, such as 10 Gigahertz (GHz) and 20 GHz. In an embodiment, dimensions of the patch antennas 104 may be optimized to match operating frequencies, enabling smaller antenna sizes and higher spatial resolution. In an exemplary embodiment, the size of the patch antenna 104 varies inversely with the operating frequencies, such that as operating frequency increases, the physical dimensions of the patch antenna 104 decrease. This relationship arises because the antenna size is proportional to a wavelength of the electromagnetic wave, which is inversely proportional to the operating frequency. Consequently, operating the system 100 at higher frequencies enables the use of smaller antennas, thereby enhancing the spatial resolution of the system 100. The enhanced spatial resolution allows the system 100 to detect finer variations in the dielectric properties of the multiphase fluid, resulting in a more accurate and detailed characterization of fluid composition.

As compared to conventional electrode-based systems, the patch antennas 104 provide various advantages, including improved directivity and enhanced signal coupling efficiency, resulting in up to a 100-fold increase in effective signal transmission and reception. The patch antennas 104 also exhibit reduced insertion loss and an improved signal-to-noise ratio (SNR), with approximately 20 decibels (dB) enhancement, which is attributed to the use of a main radiation lobe instead of side lobes. This improvement significantly enhances the sensitivity to minor dielectric variations, which is critical for accurate fluid analysis. Furthermore, the reception efficiency of the patch antennas 104 is higher because the received signal power increases proportionally to a product of transmitting antenna gain $G_t$ and receiving antenna gain $G_r$. Since the transmitting antenna 104a and the receiving antenna 104b are identical, $G_t=G_r=G$, resulting in an overall increase by a factor of $G^2$. This can lead to performance improvement ranging from 15 to 60 times compared to non-optimized systems.

The electromagnetic wave generator 106 is connected to the patch antennas 104 in a manner that enables sequential transmission of the electromagnetic wave through the pairs of patch antennas 104 distributed around the pipe section 102. In an embodiment, the electromagnetic wave generator 106 may be connected to the patch antennas 104 through coaxial cables or microstrip transmission lines, with each line delivering a controlled signal to an individual transmitting antenna 104a. In another embodiment, the electromagnetic wave generator 106 may be integrated directly into the same substrate as the patch antennas 104, forming a compact antenna and signal generator module. In yet another embodiment, the electromagnetic wave generator 106 may be connected to the patch antennas 104 wirelessly or through an inductive coupling. The electromagnetic wave generator 106 produces the transmitted signals, including the electromagnetic waves that propagate through the multiphase fluid flowing within the pipe section 102. In an embodiment, the electromagnetic wave generator 106 may be controlled by the processing unit 112 or a timer (not shown), which initiates and regulates the generation of the transmitted signals. The timer may be configured to trigger a signal of electromagnetic wave generation based on predefined time intervals, allowing the electromagnetic wave generator 106 to operate in a periodic or time-synchronized manner. For example, in time-division multiplexed (TDM) systems or real-time monitoring applications, the timer ensures that the electromagnetic waves are generated at fixed intervals (e.g., every 100 microseconds) to maintain consistent scanning and data acquisition cycles. In an embodiment, the timer may be configured to coordinate signal generation with the electronic switching network 120 that sequentially activates the pairs of patch antennas 104 to ensure orderly transmission and reception around the circumference of the pipe section 102.

Upon receiving a control signal either from the processing unit 112 or the timer, the electromagnetic wave generator 106 starts producing the electromagnetic waves at a specified frequency, which are then transmitted via the patch antennas 104 for phase-based sensing.

Figure 2A:
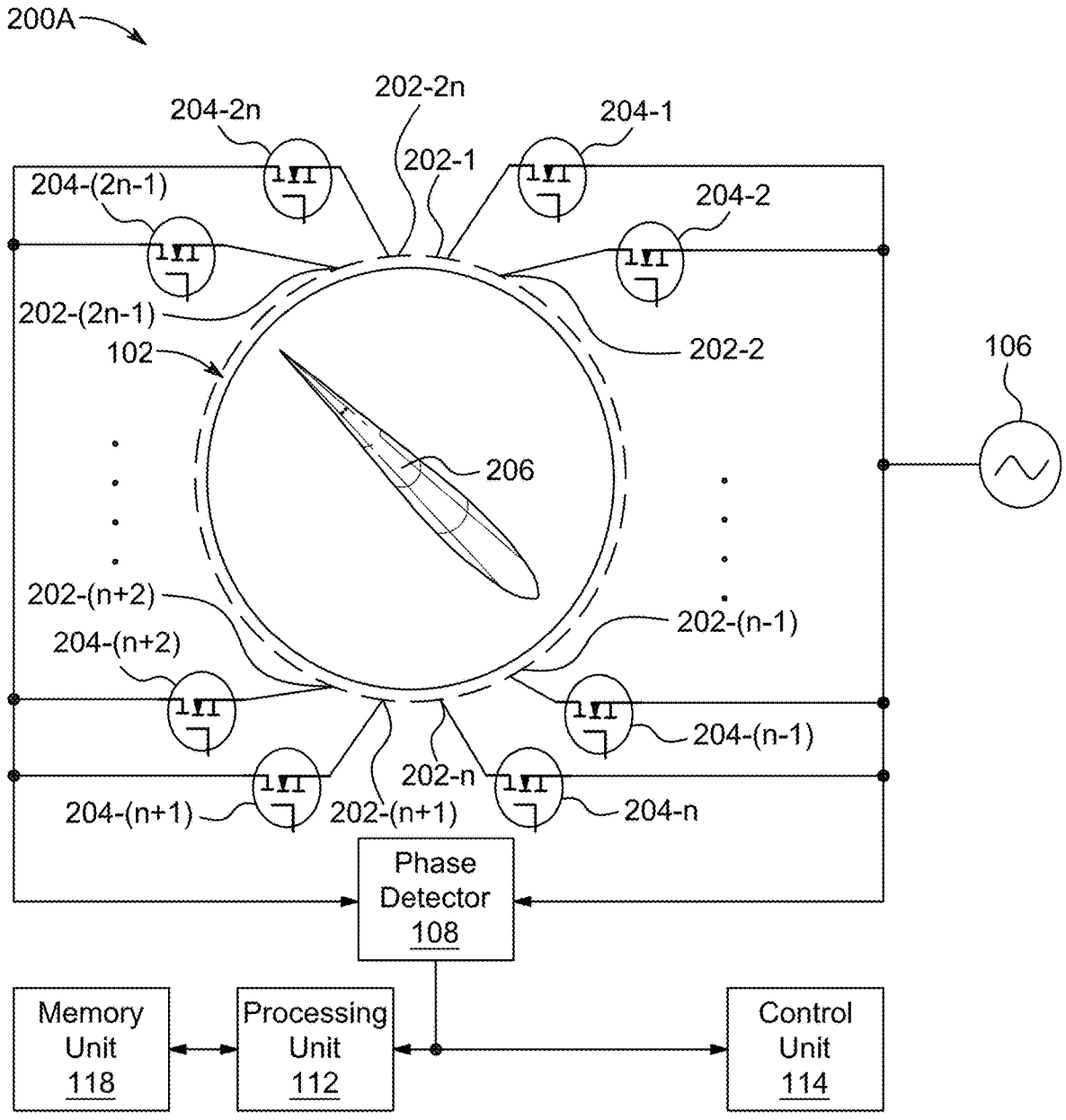
FIG. 2A illustrates an exemplary configuration of the system operating in an electronic scanning mode, according to certain embodiments.
Figure 2B:
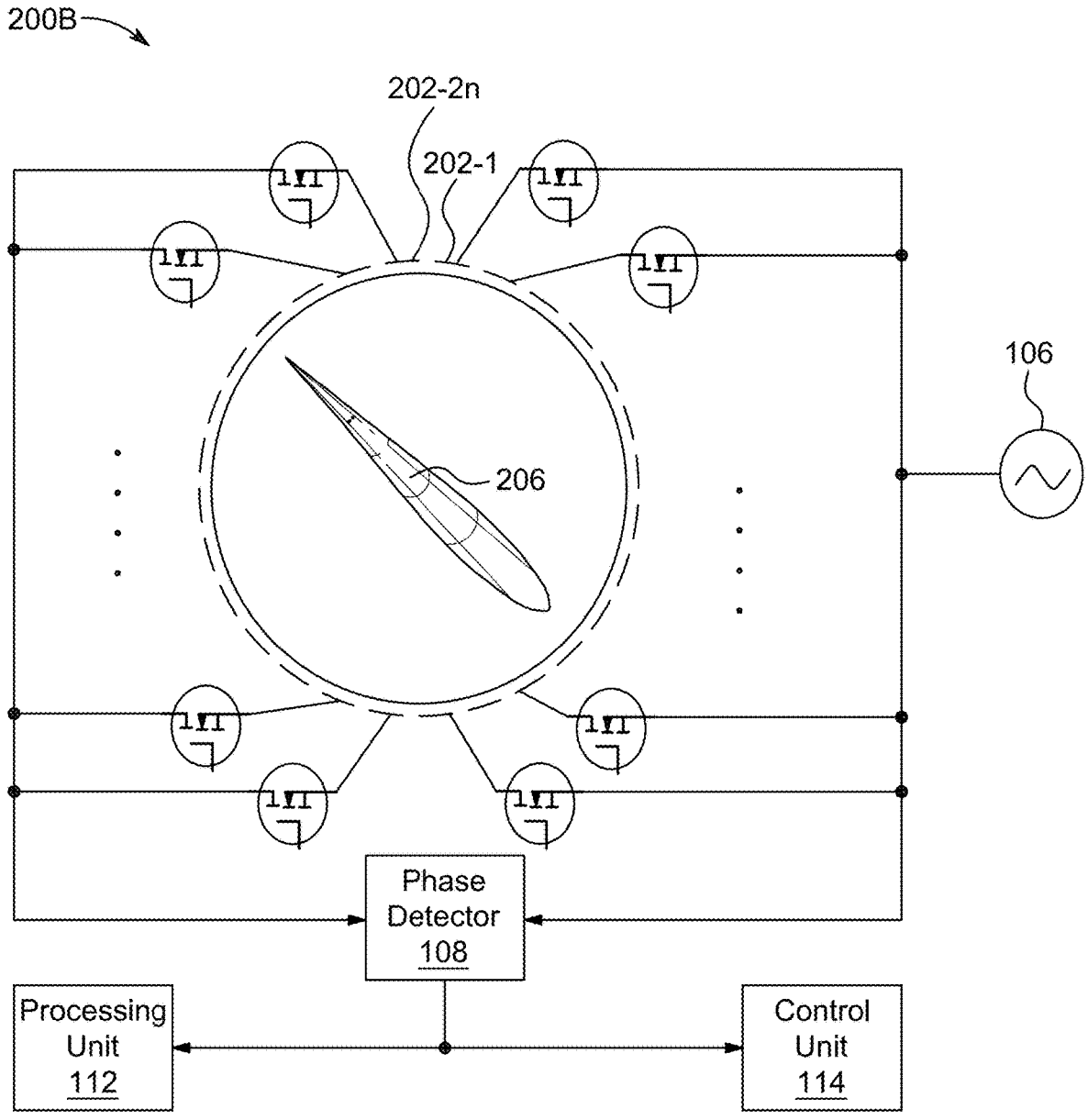
FIG. 2B illustrates an exemplary configuration of the system operating in the electronic scanning mode for phase-based sensing using a dual-frequency operation, according to certain embodiments.

In an embodiment, the electromagnetic wave generator 106 generates the transmitted signals at two different frequencies, enabling dual-frequency operation (discussed in detail in FIG. 2B). The dual-frequency operation utilizes a frequency-dependent behavior of the dielectric constant of the multiphase fluid, improving the precision of dielectric property measurements across varying fluid compositions. Specifically, this dual-frequency approach allows the system to distinguish between different constituents with greater accuracy by comparing how each constituent affects signal phase differently at distinct frequencies.

In an embodiment, the electromagnetic wave generator 106 may be implemented as a millimeter-wave signal generator operating at frequencies above 10 GHz, for example, in a range of 10 GHz to 30 GHz. Operating within this millimeter-wave frequency range enhances measurement sensitivity, resolution, and accuracy in detecting the phase shifts, thereby improving the estimation of the constituents in the multiphase fluid. The use of the millimeter-wave frequency range allows for the use of small antenna sizes and enables the system 100 to detect small changes in the dielectric properties of the multiphase fluid. This is beneficial for industrial applications such as chemical processing, oil and gas flow monitoring, and water treatment, where real-time, accurate fluid composition analysis is essential.

In operation, the electromagnetic wave generator 106 produces the transmitted signals, including high-frequency electromagnetic waves, which are emitted from a subset of the patch antennas 104 functioning as the transmitting antennas 104a, positioned on one side of the pipe section 102. The electromagnetic waves propagate through the pipe section 102 and the multiphase fluid flowing within the pipe section 102. As the electromagnetic waves traverse the multiphase fluid, they interact with the dielectric variations caused by differences in the composition of the constituents of the fluid medium, resulting in a phase shift. The transmitted signals, after passing through the fluid medium, become the received signals, which are received by another subset of the patch antennas 104 functioning as the receiving antennas 104b, positioned on the opposite side of the pipe section 102. The phase shift is detected by the phase detector 108 and subsequently analyzed to determine the relative proportions of the constituents in the multiphase fluid.

The phase detector 108 is connected to the patch antennas 104 to detect and analyze the phase shifts in the electromagnetic waves after the electromagnetic waves have traversed the multiphase fluid. In one embodiment, the phase detector 108 may be connected to the patch antennas 104 through the coaxial cables. In another embodiment, the phase detector 108 may be connected to the patch antennas 104 using one or more microstrip transmission lines fabricated on a shared or adjacent printed circuit board (PCB) or the flexible substrate 126, which minimizes space and supports compact system integration. In yet another embodiment, the phase detector 108 may be fabricated or mounted directly onto the same substrate as the patch antennas 104, forming a hybrid integrated module that reduces interconnect loss and enhances signal fidelity. In some embodiments, the phase detector 108 may be connected to the patch antennas 104 via wireless links or inductive coupling.

In an embodiment, the phase detector 108 is implemented as a standalone hardware unit, while in another embodiment, the phase detector 108 may be integrated into a system-on-chip (SoC) or a modular signal processing circuit that also contains the electromagnetic wave generator 106 and the processing unit 112, enabling a compact and efficient real-time sensing system.

The phase detector 108 is configured to measure the phase shift value between a transmitted signal and a received signal that has propagated through the multiphase fluid inside the pipe section 102. In a preferred embodiment, the phase detector 108 may receive the receiving signal (i.e., electromagnetic wave) captured by the receiving antenna 104b and measure a $S_{12}$ phase parameter. The $S_{12}$ phase parameter refers to the phase shift experienced by the electromagnetic wave as the electromagnetic wave leaves the transmitting antenna 104a, travels through the pipe section 102 and the multiphase fluid, and reaches the receiving antenna 104b. This phase shift is indicative of changes in the dielectric properties of the multiphase fluid and is used to estimate the relative proportions of the constituents in the multiphase fluid. By capturing a phase component (rather than magnitude) of an S-parameter, the phase detector 108 enables highly sensitive detection of the small variations in the dielectric constant of the multiphase fluid.

In one embodiment, the phase detector 108 is configured to receive the received signal (i.e., an electromagnetic signal that has undergone phase modulation as a result of its interaction with the fluid medium) via the receiving antenna 104b. The phase detector 108 is further configured to compare a phase of the received signal with a phase of a corresponding reference signal derived from the transmitted signal. The reference signal may either be a known signal stored in the memory unit 118 or a real-time signal generated by the electromagnetic wave generator 106, representing the transmitted signal prior to its interaction with the multiphase fluid.

The phase detector 108 is further configured to identify a phase difference between the reference signal and the received signal for calculating the phase shift value corresponding to a propagation path of the electromagnetic wave through the multiphase fluid. The calculated phase shift value enables the detection of variations in the dielectric properties, which are indicative of different constituents in the multiphase fluid. In an embodiment, the calculated phase shift value may be an analog phase shift signal that may be communicated to the data acquisition module 110.

The data acquisition module 110 serves as a critical interface between an analog signal domain and a digital processing domain. In one embodiment, the data acquisition module 110 is electrically coupled to the phase detector 108 and configured to capture the phase shift signal (i.e., phase shift measurement) at a sampling rate that corresponds to a flow velocity of the multiphase fluid. This ensures that transient variations in the dielectric properties are accurately resolved in time. The data acquisition module 110 may be configured to process the captured phase shift signal to determine the corresponding phase shift value. In an embodiment, the data acquisition module 110 may be configured to process the captured phase shift signal by converting the analog phase shift signal into digitized phase shift data for further analysis.

In an exemplary embodiment, the data acquisition module 110 may include high-speed analog-to-digital converters (ADCs) that convert the analog phase shift signal, such as in-phase (I) and quadrature (Q) components or analog representations of the phase shift value into high-resolution digitized phase shift data while preserving the integrity and fidelity of the phase shift data across a wide frequency spectrum.

In an embodiment, the digitized phase shift data may be temporarily stored in a buffer memory (not shown), allowing for stable data transfer to the processing unit 112, even under high data throughput conditions. In an embodiment, the data acquisition module 110 may include wired or wireless communication interfaces (e.g., serial peripheral interface (SPI), universal serial bus (USB), Ethernet, or industrial protocols) to transmit the digitized phase shift data to the processing unit 112.

To ensure long-term stability and reliability, the data acquisition module 110 may further include a calibration logic to compensate for gain mismatches, temperature drift, or other environmental effects. In some embodiments, built-in self-test (BIST) features may also be integrated into the data acquisition module 110 for fault detection and diagnostics. The data acquisition module 110 may be implemented as a standalone unit or co-packaged with the phase detector 108 and the processing unit 112 in a compact form factor suitable for harsh or space-constrained industrial environments.

In an alternative embodiment, the phase detector 108 itself may be configured to perform both phase shift detection and digital conversion, thereby eliminating the need for the data acquisition module 110. In such cases, the phase detector 108 directly outputs the digitized phase shift data to the processing unit 112. This embodiment simplifies system architecture, reduces latency, and is especially suitable for compact or embedded applications where power and space efficiency are critical. In this embodiment, the phase detector 108 may internally include the ADCs, digital control logic, and interface protocols (e.g., SPI, inter-integrated circuit (I2C), or universal asynchronous receiver-transmitter (UART)) for direct digital communication with the processing unit 112.

Mathematically, when the electromagnetic wave of wavelength $\lambda$ propagates a distance d (pipe diameter) through a homogeneous medium (i.e., multiphase fluid) with the dielectric constant $\varepsilon_r$, the phase shift ($\varphi$) is expressed as:

$$\varphi = \frac{2\pi d \sqrt{\epsilon_r}}{\lambda} \tag{1}$$

A small variation in the dielectric constant ($\delta\epsilon_r$) causes a corresponding phase shift variation ($\delta\varphi$), expressed as:

$$\delta\varphi = \frac{2\pi d\ \delta\epsilon_r}{2\lambda\sqrt{\epsilon_r}} = \frac{\pi d\ \delta\epsilon_r}{\lambda\sqrt{\epsilon_r}} \tag{2}$$

Since dielectric constant $\epsilon_r \approx 1$ for gases, the expression (2) simplifies to:

$$\delta\varphi \approx \frac{\pi d\ \delta\epsilon_r}{\lambda} \tag{3}$$

To maximize the sensitivity to the small changes in the dielectric properties, the operating wavelength (f) needs to satisfy:

$$\lambda \ll \pi d\ \delta\epsilon_r\ \text{or}\ f \gg \frac{c}{\pi d\ \delta\epsilon_r}, \tag{4}$$

where c is the speed of light in a vacuum and f is the operating frequency. The use of high-frequency operation (e.g., millimeter-wave range >10 GHz) ensures small wavelengths ($\lambda$), thus enabling the detection of small dielectric variations ($\delta\epsilon_r$). This results in a higher SNR, rapid response time, and improved spatial resolution for determining relative constituent ratios in the multiphase fluid.

For example: if the pipe diameter, d=10 cm and the dielectric variation, $\delta\epsilon_r$=0.1, then the minimum required frequency is:

$$f >> 3*10^8/(\Pi*0.2*0.05)=10\ \text{GHz}$$

The processing unit 112 is operably connected to the phase detector 108, either directly or via the data acquisition module 110, to receive the digitized phase shift data. The processing unit 112 is configured to process the phase shift data of the electromagnetic wave that has propagated through the multiphase fluid flow inside the pipe section 102. Based on the phase shift data, the processing unit 112 is configured to determine the relative proportions of individual constituents in the multiphase fluid.

In an embodiment, the processing unit 112 is configured to store the received phase shift data in the memory unit 118 for subsequent analysis. The memory unit 118 facilitates temporal correlation and trend analysis by maintaining time-stamped records of reference phase shift measurements associated with the individual fluid constituents. The processing unit 112 is further configured to perform a correlation between new phase shift data and the stored phase shift data. In an exemplary embodiment, the correlation may involve comparing current phase shift measurements with the reference phase shift measurements stored corresponding to known individual fluid constituents. The processing unit 112 may further be configured to analyze deviations or consistencies between the current phase shift measurements and the reference phase shift measurements to detect dynamic changes in the fluid composition, assess fluid homogeneity, and ensure measurement consistency. To perform this correlation effectively, the processing unit 112 may be configured to apply one or more signal processing techniques, such as but not limited to, cross-correlation analysis, moving average filtering, time-domain signal analytics, and so forth. The signal processing techniques enable the processing unit 112 to extract meaningful patterns from the new phase shift data, mitigate impact of noise or transient disturbances, and establish accurate temporal associations between the phase shift measurements. For example, if the current phase shift data resembles that of a high-dielectric fluid (e.g., water), the processing unit 112 may infer an increased presence of water in the pipe section 102.

The processing unit 112 is further configured to calculate the dielectric properties (including dielectric constant) of the multiphase fluid by using the new phase shift data. The dielectric constant ($\epsilon_r$) is indicative of material properties of the fluid and varies significantly between different fluid types, such as water, which has a high $\epsilon r$ ($\sim$80), oil, which has a lower $\epsilon r$ ($\sim$2-5), and gas, which has the lowest $\epsilon r$ ($\sim$1). To calculate the dielectric constant ($\epsilon r$), the processing unit 112 may use equation (1) as defined earlier. By rearranging equation (1), the processing unit 112 is configured to determine the dielectric constant ($\epsilon_r$) of the multiphase fluid. Since the phase shift ($\varphi$), the pipe diameter (d), and the wavelength ($\lambda$) are either known or measurable, the dielectric constant ($\epsilon_r$) may be accurately calculated using equation (1). The calculated dielectric constant ($\epsilon_r$) provides an insight into the type of fluid the electromagnetic wave has passed through. By determining the dielectric constant ($\epsilon_r$), the processing unit 112 may identify the presence and proportion of different constituents in the multiphase fluid. This information is essential for analyzing the overall composition of the multiphase fluid in real-time.

To enhance the spatial resolution of composition analysis, the processing unit 112 is configured to divide the propagation path between the patch antennas 104 into discrete segments (pixels) along the cross-section or flow direction of the pipe section 102. Each segment corresponds to the constituent of the multiphase fluid with a specific dielectric constant. The total phase shift across the path is expressed as a summation of contributions from each segment, allowing the processing unit 112 to approximate the proportion of each fluid type. For instance, in a two-fluid model, if $N_1$ and $N_2$ represent the number of segments occupied by materials with the dielectric constants $\epsilon_{r1}$ and $\epsilon_{r2}$, respectively, a total measured phase shift $\varphi_m$ is modeled using equation (5):

$$\frac{2\pi\sqrt{\epsilon_{r1}}\ N_1 d}{\lambda(N_1 + N_2)} + \frac{2\pi\sqrt{\epsilon_{r2}}\ N_2 d}{\lambda(N_1 + N_2)} = \varphi_m \tag{5}$$

By digitizing the propagation path between the patch antennas 104 into the number of segments (N), the processing unit 112 enables precise evaluation of the ratio of different constituents in the multiphase fluid. In some embodiments, the processing unit 112 is configured to transmit the calculated ratio of the fluid constituents to the memory unit 118 and the control unit 114.

The processing unit 112 may include a communication interface (e.g., Ethernet, wireless module) to transmit computed results, alerts, or raw phase data to external supervisory control systems (e.g., supervisory control and data acquisition (SCADA), distributed control system (DCS), or cloud-based analytics platforms). In an embodiment, the processing unit 112 may be implemented as a standalone microprocessor, a field-programmable gate array (FPGA), a digital signal processor (DSP), or an embedded system. In another embodiment, the processing unit 112 may be integrated within the SoC, which also includes signal acquisition and control functionality.

The control unit 114 is operably connected to the processing unit 112 and configured to generate one or more control signals based on the calculated ratio of the fluid constituents. The control unit 114 may be configured to generate the control signals to adjust the multiphase fluid flow based on the calculated ratio of the fluid constituents. In an exemplary embodiment, the control unit 114 may be configured to compare the calculated ratio of the fluid constituents with target compositions. Based on this comparison, the control unit 114 may be configured to generate and transmit the control signals to actuate flow regulation components, such as electronically controlled valves, variable-speed pumps, servo-actuated diverters, and so forth, that may be positioned upstream or downstream of the pipe section 102. For example, if the dielectric constant indicates a high water content in the oil stream, the control unit 114 may trigger a diverter valve to route the multiphase fluid to a separation unit or to slow the flow rate for improved phase separation. Alternatively, the control unit 114 may be configured to adjust pumping speeds, flow rates, or chemical injection parameters to optimize fluid handling based on real-time composition analysis. This feedback capability allows for dynamic and automated adjustment of process parameters, enhancing operational efficiency, reducing downtime, and improving product quality in applications such as oil and gas production, pipeline monitoring, and chemical processing. The control unit 114 may include, but is not limited to, a signal processor, a digital logic circuitry, a programmable logic controller (e.g., PLC or microcontroller), and so forth.

Further, the calibration module 116 is operably coupled to the processing unit 112. The calibration module 116 is configured to establish baseline reference data essential for accurate and reliable interpretation of the phase shift measurements during normal operation. This calibration process accounts for the intrinsic dielectric properties of the individual fluid constituents and ensures that the phase shift measurements collected during the multiphase flow are correctly associated with specific components of the fluid mixture. Additionally, the calibration module 116 compensates for variations in pipe wall thickness and dynamic fluid properties, which may otherwise introduce measurement inaccuracies, thereby enhancing overall precision and robustness of the system 100.

In an embodiment, the calibration process may be performed during an initial deployment of the system 100. In another embodiment, the calibration process may be periodically executed as part of scheduled maintenance routines. Such periodic calibrations help maintain long-term measurement accuracy by compensating for sensor drift, temperature fluctuations, or other environmental changes that could otherwise impact signal integrity. To perform the calibration, the pipe section 102, including the patch antennas 104, is first isolated from external fluid flow and disturbances. In one exemplary embodiment, the system 100 is switched into a calibration mode, where the pipe section 102 is sequentially filled with known pure fluid constituents.

These constituents may include, but are not limited to, pure gas (e.g., methane), crude oil, and water. Each constituent is introduced individually into the pipe section 102 under controlled environmental conditions (e.g., known temperature and pressure) to serve as a dielectric reference. During the calibration for the corresponding constituent, the processing unit 112 activates the selected transmitting antenna 104a to emit the electromagnetic wave at a predefined frequency or set of frequencies. The electromagnetic wave propagates through the fluid and is received by the designated receiving antenna 104b, preferably aligned diametrically opposite the transmitting antenna 104a. This alignment ensures that the electromagnetic wave travels along a central axis of the pipe section 102, forming a symmetric and reproducible propagation path that maximizes interaction with the bulk of the fluid. For example, using a direct horizontal path across the pipe diameter reduces edge diffraction effects and enhances the sensitivity to core fluid properties.

Thereafter, the received signal is fed into the phase detector 108, which calculates the phase shift introduced by the fluid currently inside the pipe section 102. This calculated phase shift is transmitted to the processing unit 112 and subsequently stored in the dedicated memory unit 118, which forms part of the calibration module 116.

In some embodiments, the calibration module 116 may be configured to perform multi-frequency calibration, where each fluid constituent is measured using two or more distinct operating frequencies. This approach enhances dielectric resolution, as the dielectric response of many fluids is frequency-dependent. For instance, by capturing the phase shift data at both 10 GHz and 20 GHz for each constituent filling the pipe, the system 100 may later use this dual-frequency signature to differentiate between these constituents in complex fluid mixtures. Once the calibration phase is complete and phase shift reference signatures for all targeted constituents are acquired and securely stored, the system 100 exits the calibration mode. The calibration procedure may be performed initially during system installation, and may be periodically repeated based on predetermined time intervals or when operating conditions change significantly. The calibration reference data establishes a foundational basis for the system's measurements across the expected range of constituent compositions, facilitating reliable interpretation of phase shift data during normal operation.

The memory unit 118 is electrically connected to the processing unit 112 via a high-speed data bus and is configured to store the phase shift values along with associated metadata, such as but not limited to, identity of the fluid constituent (e.g., gas, oil, water), the operating frequency or frequencies used during measurement, temperature and pressure conditions at the time of calibration, an antenna pair identifier involved in the measurement, timestamp and calibration session identifier, and so forth. This information forms a library of the reference phase shift measurements that may be retrieved and utilized during live multiphase flow analysis. The memory unit 118 is also configured to store the calculated ratios of the fluid constituents derived from the measured phase shifts. In an embodiment, the calculated ratios of the fluid constituents may be displayed on a user interface (not shown) in a graphical representation form to facilitate operator analysis and decision-making.

In an embodiment, the memory unit 118 may include a timestamping module that associates each recorded data entry with a corresponding measurement time. This enables the construction of a continuous, time-resolved dataset reflecting the dynamic changes in the fluid composition within the pipe section 102. The memory unit 118 is also configured to store multiple phase shift reference signatures, including data captured at different operating frequencies, enabling support for multi-frequency analysis. The memory unit 118 may be, but is not limited to, a random-access memory (RAM), a read-only memory (ROM), a flash memory, and so forth. Embodiments of the present disclosure are intended to include or otherwise cover any type of the memory unit 118, including known, related art, and/or later developed technologies.

The electronic switching network 120 is operably connected to the patch antennas 104 and the electromagnetic wave generator 106. The electronic switching network 120 is implemented as part of an electronic scanning mode of the system 100 and is configured to dynamically and selectively activate different pairs of patch antennas 104 in a predetermined or adaptive sequence. This configuration allows for sequential phase shift measurements across multiple angular positions distributed around the circumference of the pipe section 102. An exemplary configuration of the electronic scanning mode is illustrated in FIG. 2A.

The system 100 also includes the timing controller 122 that is electrically coupled to the electronic switching network 120 via one or more signal lines. The timing controller 122 is configured to regulate a measurement sequence and activation timing, ensuring that the pairs of patch antennas 104 are selected and triggered in a coordinated manner. For example, the timing controller 122 may determine the sequence in which the pairs of patch antennas 104 are activated for transmission and reception, an activation duration for each pair of the patch antennas 104, and a sampling rate to match the expected flow dynamics of the multiphase fluid.

During operation, the timing controller 122 plays a central role in coordinating the measurement process by managing the activation timing and sequencing of the patch antennas 104 through the electronic switching network 120. For example, the timing controller 122 generates and transmits control signals to the electronic switching network 120 to dynamically establish a transmission path from the electromagnetic wave generator 106 to the selected transmitting antenna 104a. At the same time, the electronic switching network 120 configures a corresponding receiving path from the receiving antenna 104b, preferably positioned diametrically opposite the transmitting antenna 140a, to the phase detector 108. This configuration allows the electromagnetic wave to propagate along a well-defined radial path through the center of the pipe section 102, where the electromagnetic wave intersects with the fluid medium. As the electromagnetic wave travels through the fluid medium, it undergoes the phase shift that is captured by the phase detector 108. The measured phase shift provides information about the dielectric properties and composition of the fluid along the path.

Once the measurement for the selected pair of patch antennas 104 is completed, the timing controller 122 initiates the next cycle by issuing updated control signals to the electronic switching network 120. This deactivates the current pair of patch antennas 104 and activates a next predefined antenna pair in a scanning sequence. The timing controller 122 ensures that the transition between the antenna pairs is synchronized with the data acquisition module 110, maintaining precise timing for high-fidelity measurements. This scanning process continues sequentially until all predefined antenna pairs have been activated and corresponding phase shift data have been collected. For example, in a configuration including 12 patch antennas uniformly distributed around the circumference of the pipe section 102, the timing controller 122 may define and control up to 6 diametrically opposed antenna pairs. This setup enables full 360-degree spatial coverage of the pipe cross-section, allowing for comprehensive monitoring of fluid distribution and composition.

In some embodiments, the system 100 may facilitate adaptive switching logic where an antenna selection pattern is dynamically altered in response to prior measurement results, flow disturbances, or targeted scanning needs. This may be used to increase measurement density in regions of suspected fluid inhomogeneity or to conserve power during periods of steady flow.

In certain embodiments, the electronic switching network 120 may support multi-frequency operation, allowing the same antenna pair to sequentially transmit and receive the electromagnetic waves at different frequencies during a single scanning cycle. For instance, a patch antenna pair may first be used at 10 GHz to probe large-scale dielectric constants and subsequently at 20 GHz to capture finer spatial variations. The high-speed electronic switching network 120, in combination with the precise timing control provided by the timing controller 122, enables the system 100 to operate in a time-multiplexed mode. This allows for rapid data acquisition across multiple spatial paths while minimizing signal interference, ensuring high-throughput and low-latency performance critical to real-time fluid monitoring and control applications.

Figure 2C:
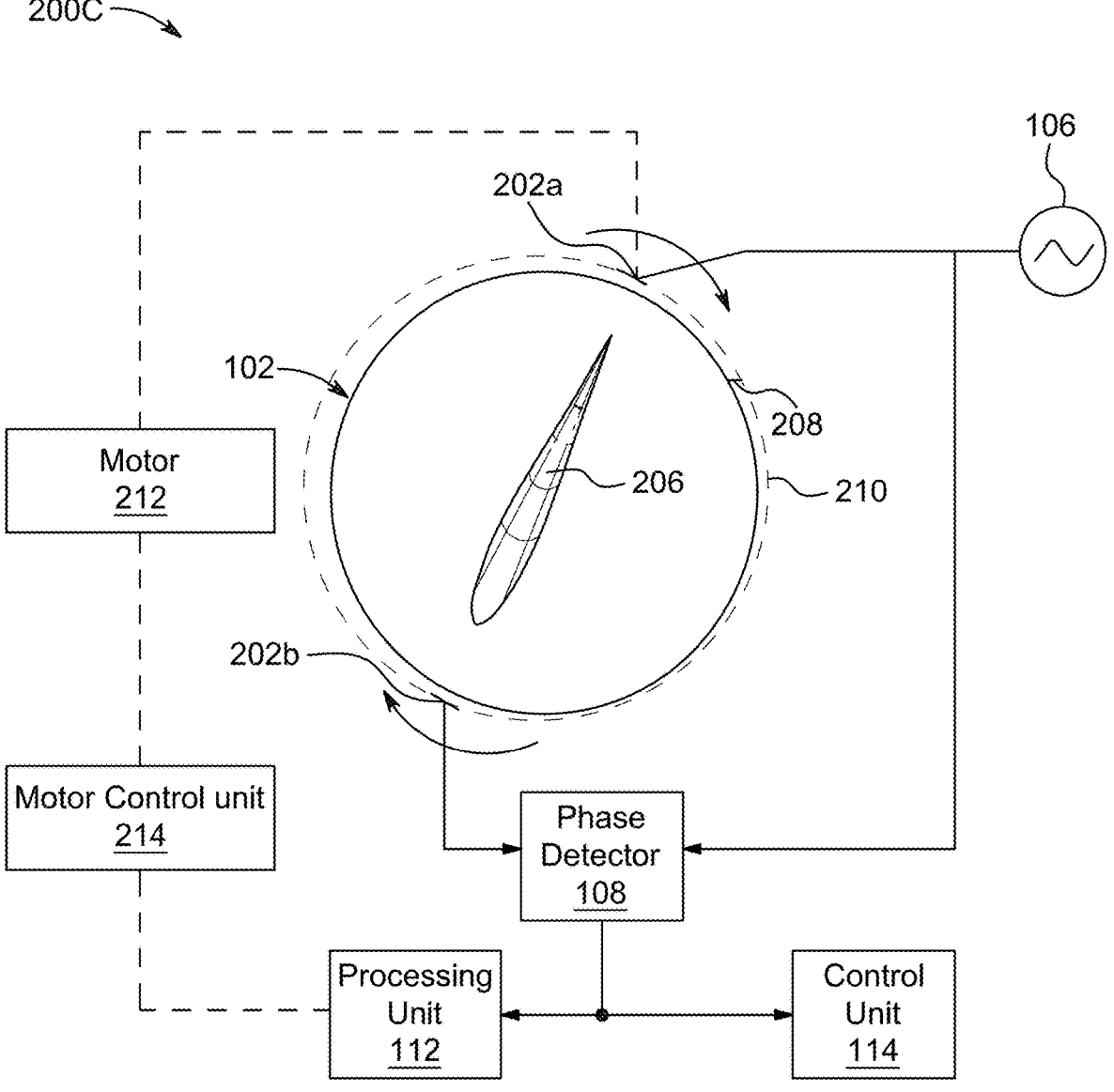
FIG. 2C illustrates an exemplary configuration of the system operating in a mechanical scanning mode using a single antenna pair, according to certain embodiments.

The mechanical scanning mechanism 124 is electrically coupled to the processing unit 112. The mechanical scanning mechanism 124 is implemented as part of a mechanical scanning mode of the system 100 and is configured to enable dynamic physical repositioning of the patch antennas 104 around the circumference of the pipe section 102. The mechanical scanning mechanism 124 facilitates spatially resolved interrogation of the multiphase fluid within the pipe section 102 by allowing at least one single transmitting antenna 104a and at least one receiving antenna 104b to be rotated along the exterior surface of the pipe section 102, thereby enabling the system 100 to measure the dielectric properties across multiple radial paths. An exemplary configuration of the mechanical scanning mode is illustrated in FIG. 2C.

In an embodiment, the processing unit 112 may be configured to regulate the operation of the mechanical scanning mechanism 124 based on predefined control logic or in response to real-time flow conditions. For example, the processing unit 112 may generate and transmit the control signal to the mechanical scanning mechanism 124 to adjust its scanning speed or angular step size. These adjustments are made in response to real-time measurements such as fluid flow velocity, turbulence levels, or signal noise detected in the phase shift data. By increasing the scanning speed during stable flow conditions or decreasing the angular step size in regions of suspected inhomogeneity, the system 100 may optimize the spatial resolution, data acquisition efficiency, and signal fidelity for accurate fluid monitoring.

In some embodiments, the mechanical scanning mechanism 124 operates in conjunction with the electronic switching network 120 described previously, allowing hybrid operation modes wherein both mechanical and electronic antenna selection are used. This enables high-resolution scanning with fewer physical antennas or facilitates selective scanning in high-priority angular sectors while conserving power and minimizing mechanical wear.

FIG. 2A illustrates an exemplary configuration 200A of the system 100 operating in the electronic scanning mode, according to certain embodiments. In the configuration 200A, multiple patch antennas 202-1 through 202-2n are circumferentially arranged on the pipe section 102 for phase shift-based sensing. In an embodiment, the patch antennas 202-1 through 202-2n correspond to the patch antennas 104 of FIG. 1. As used herein, the term "phase shift-based sensing" refers to a method of detecting and quantifying physical or chemical properties of the medium (i.e., multiphase fluid) by measuring the phase shift experienced by the electromagnetic wave as it travels through the medium.

In the configuration 200A, the system 100 utilizes electronically controlled antenna switching to selectively activate different pairs of the patch antennas 202-1 through 202-2n, enabling non-invasive, real-time monitoring of multiphase fluid flow 206 across multiple angular positions. In an embodiment, the multiphase fluid flow 206 corresponds to the multiphase fluid flow of FIG. 1.

In an exemplary embodiment, a total of 2n patch antennas 202-1 through 202-2n, are mounted around the exterior surface of the pipe section 102, distributed at uniform angular intervals to form a circular antenna array. The antenna array includes n transmitting antennas, referenced as 202-1 through 202-n and $n$ receiving antennas, referenced as 202-(n+1) through 202-2n. In an embodiment, the n transmitting antennas 202-1 through 202-n and the n receiving antennas 202-(n+1) through 202-2n correspond to the transmitting antennas 104a and the receiving antennas 104b, respectively, of FIG. 1.

Each transmitting antenna 202-1 or 202-2 or . . . 202-n is paired with the corresponding receiving antenna 202-(n+1) or 202-(n+2) or . . . 202-2n located diametrically opposite across the pipe section 102, creating a direct signal propagation path through the central axis of the pipe section 102. For example, in an implementation where n=5, ten patch antennas are evenly spaced at 30-degree intervals around the 360° circumference of the pipe section 102. This symmetric layout enables the system 100 to perform the phase shift measurements along multiple angular paths, facilitating spatially resolved sensing of fluid properties inside the pipe section 102.

In the electronic scanning mode, each pair of patch antennas 202-1 through 202-2n may be activated via the electronic switching network 120 (as shown in FIG. 1). The electronic switching network 120 includes high-frequency switches 204-1 through 204-2n, each operably associated with the corresponding patch antennas 202-1 through 202-2n. In an exemplary embodiment, the switches 204-1 through 204-2n may be denoted as $SW_{i,j}$, where i denotes an antenna pair index (e.g., 1 through n) and j denotes the antenna role within the pair, with j=1 for a transmitting antenna and j=2 for a receiving antenna.

These switches 204-1 through 204-2n are configured to enable selective and sequential activation of the pairs of the transmitting antenna 202-1 through 202-n and the receiving antenna 202-(n+1) through 202-2n positioned around the circumference of the pipe section 102. As discussed in FIG. 1, the timing controller 122 is electrically coupled to the electronic switching network 120. The timing controller 122 is configured to coordinate the activation and deactivation of the switches 204-1 through 204-2n during each measurement cycle. The switches 204-1 through 204-2n may include, but are not limited to, field-effect transistors (FETs), positive-intrinsic-negative diodes (PIN) diodes, microelectromechanical systems (MEMS) switches, and so forth.

In operation, the timing controller 122 transmits the control signals to the electronic switching network 120 to activate a first pair of switches, e.g., $SW_{1,1}$ 204-1 and $SW_{1,2}$ 204-(n+1), corresponding to a first transmitting antenna 202-1 and a diametrically opposite receiving antenna 202-(n+1). The activated first pair of switches 204-1 and 204-(n+1) establish a signal path from the electromagnetic wave generator 106 to the selected transmitting antenna 202-1 and simultaneously connect the corresponding receiving antenna 202-(n+1) to the phase detector 108.

Upon activation, the electromagnetic wave generator 106 emits a high-frequency electromagnetic wave, such as a millimeter-wave (mm-wave) signal, which is transmitted as the transmitting signal through the multiphase fluid within the pipe section 102 via the transmitting antenna 202-1. As the electromagnetic wave propagates through the multiphase fluid, the electromagnetic wave experiences a phase delay influenced by the effective dielectric constant of the constituents along the propagation path. The receiving antenna 202-(n+1) captures the receiving signal (electromagnetic wave) after it has traversed the multiphase fluid, and the phase detector 108 computes the phase shift between the transmitted signal and the received signal.

The measured phase shift is transmitted to the processing unit 112 (as discussed in detail in FIG. 1), configured to calculate the ratio of fluid constituents (e.g., oil, gas, water) within the multiphase fluid flow 206 based on the dielectric-dependent phase delay observed along each transmission path. The calculated ratio is subsequently logged into the memory unit 118, which maintains the time-stamped history of constituent compositions, enabling real-time trend analysis and historical review. Furthermore, the control unit 114 uses the calculated ratio of the fluid constituents to generate the control signals for modulating the valves, pumps, or actuators to optimize or adjust the multiphase fluid flow 206 in response to real-time compositional changes.

Upon completion of the phase shift measurement using the first antenna pair, including the transmitting antenna 202-1 and diametrically opposite receiving antenna 202-(n+1), the associated first pair of switches 204-1 and 204-(n+1) are deactivated. Subsequently, the electronic switching network 120 activates a second antenna pair by enabling switches, e.g., $SW_{2,1}$ 204-2 and $SW_{2,2}$ 204-(n+2), corresponding to a second transmitting antenna 202-2 and a second receiving antenna 202-(n+2), respectively. Similarly, for $(n-1)^{th}$ antenna pair, switches, e.g., $SW_{(n-1),1}$ 204-(n-1) and $SW_{(n-1),2}$ 204-(2n-1) are activated to connect $(n-1)^{th}$ transmitting antenna 202-(n-1) and $(n-1)^{th}$ receiving antenna 202-(2n-1). For the $n^{th}$ antenna pair, switches, e.g., $SW_{n,1}$ 204-n and $SW_{n,1}$ 2204-2n, are activated to connect the ntl transmitting antenna 202-n and the $n^{th}$ receiving antenna 202-2n. This sequential scanning process continues until all antenna pairs have been activated in turn and corresponding phase shift measurements have been acquired. Upon completion of one full measurement cycle across all the antenna pairs, the system 100 automatically restarts the sequence. This enables continuous, real-time monitoring of dielectric dynamics and fluid composition inside the pipe section 102, which is useful in dynamic industrial environments such as petroleum pipelines or chemical reactors.

As an exemplary embodiment of the electronic scanning configuration 200A illustrated in FIG. 2A, the system 100 may utilize a fixed array of 20 patch antennas, including 10 transmitting antennas and 10 receiving antennas, circumferentially arranged around the pipe section 102 with a diameter of 10 centimeters (cm). Each patch antenna may have a width of approximately 1.5 cm. This layout enables the use of high-speed electronic switching, where each antenna pair may complete the phase shift measurement in 10 microseconds (μs). A complete scan cycle using 10 antenna pairs may thus be performed in 100 microseconds (μs), supporting 10,000 full scans per second.

This high-frequency scanning capability allows the system 100 to accurately track fluid movement at speeds up to 150 meters per second (m/s). The electronic scanning mode is, therefore, particularly suitable for fast-flowing industrial processes, including high-pressure liquid transport systems and gas pipelines, where real-time monitoring of rapid dielectric changes is critical.

FIG. 2B illustrates an exemplary configuration 200B of the system 100 operating in the electronic scanning mode for the phase-based sensing using the dual-frequency operation, according to certain embodiments. In the configuration 200B, the system 100 is adapted to perform the phase shift measurements at two distinct operating frequencies, denoted as $f_1$ and $f_2$, to enhance the accuracy and sensitivity of dielectric-based determination of the constituent ratios within the multiphase fluid.

The patch antennas 202-1 through 202-2n are designed to effectively operate across the operating frequencies $f_1$ and $f_2$. In certain embodiments, the dual-frequency capability may be achieved using broadband patch antenna structures, dual-resonant element structures, tunable antenna architectures, and so forth. The dual-frequency operation exploits the frequency-dependent nature of the dielectric constants in the multiphase fluid. As known in dielectric spectroscopy, different constituent materials, such as oil, water, and gas, exhibit distinct permittivity values that vary with the frequency. This frequency dispersion behavior may be used to extract more discriminatory information about mixture composition that may not be possible with single-frequency systems. For instance, water has a higher dielectric constant (~80) that decreases significantly with increasing frequency, while oil and gas exhibit comparatively lower and less dispersive permittivity, enabling improved constituent separation when analyzed at two or more frequencies.

In the configuration 200B, the electromagnetic wave generator 106 includes a dual-frequency RF generator that is adapted for the dual-frequency operation. Unlike a single-frequency implementation shown in FIG. 2A, the electromagnetic wave generator 106 in FIG. 2B is configured to generate and transmit the electromagnetic waves at the operating frequencies $f_1$ and $f_2$ for each antenna pair activation.

The phase detector 108 in the configuration 200B is also enhanced to support dual-frequency phase shift analysis. The phase detector 108 is configured to receive and process the received signals corresponding to both operating frequencies $f_1$ and $f_2$ for extracting respective phase shifts $\Delta\varphi_1$ and $\Delta\varphi_2$, for each transmitting-receiving antenna path. In an embodiment, the phase detector 108 may include separate phase-locked loops (PLLs), digital signal processing (DSP) chains, or heterodyne detection circuits for each frequency channel to ensure high-resolution and low-noise phase extraction. Further, the phase shift measurements for both operating frequencies $f_1$ and $f_2$ are transmitted to the processing unit 112, which applies a multi-frequency dielectric modeling algorithm. In an embodiment, the multi-frequency dielectric modeling algorithm may use the difference in dielectric responses at multiple frequencies to extract detailed fluid compositional information. The dielectric properties of individual fluid constituents, such as oil, water, and gas, are known to exhibit frequency-dependent behavior. By analyzing the phase shift data obtained at two or more operating frequencies, the multi-frequency dielectric modeling algorithm may distinguish between constituent materials even in scenarios where the dielectric constants of two constituents overlap at a single frequency. For instance, the multi-frequency dielectric modeling algorithm may use stored frequency-dispersion profiles of expected fluid types and apply a system of equations to resolve the relative proportion of each constituent in the fluid. This enables more precise determination of the constituent ratios in the multiphase mixture under varying conditions.

This dual-frequency approach is advantageous in challenging conditions, such as when temperature, pressure, or salinity variations affect dielectric behavior, or in emulsified or partially mixed fluid states. By utilizing the phase shift data at multiple frequencies, the system 100 achieves enhanced discrimination capability, robustness, and measurement confidence.

Accordingly, the configuration 200B builds upon the single-frequency system shown in FIG. 2A by integrating a dual-frequency electromagnetic signal generation, antenna design, and dual-channel phase detection. This enables improved sensitivity, real-time adaptability, and enhanced accuracy in determining the composition of the multiphase fluid flow 206 in industrial, petrochemical, or environmental monitoring applications.

FIG. 2C illustrates an exemplary configuration 200C of the system 100 operating in the mechanical scanning mode using a single antenna pair 202a-202b, according to certain embodiments. Unlike other configurations of the system 100 that utilize a fixed array of multiple patch antennas 202-1 through 202-2n (as shown in FIG. 2A) with the electronic scanning mode, this configuration 200C reduces hardware complexity by employing the single antenna pair 202a-202b. In an embodiment, the single antenna pair 202a-202b is mechanically repositioned to perform sequential measurements at different angular positions around the pipe section 102.

In the configuration 200C, the system 100 includes a single antenna pair 202a-202b, including a transmitting antenna 202a and a corresponding receiving antenna 202b, mounted on the mechanical scanning mechanism 124. In FIG. 2C, the mechanical scanning mechanism 124 is implemented as a rotatable structure connected to the single antenna pair 202a-202b via a supporting structure. The supporting structure is configured to provide structural rigidity and accurate alignment of moving components. The supporting structure may be, but is not limited to, a clamping ring assembly, a saddle mount, a hinge-lock mounting system, and so forth. In a preferred embodiment, the supporting structure may be a support bracket 208 that may be fabricated from corrosion-resistant stainless steel or reinforced polymeric composites, allowing for deployment in harsh industrial environments such as offshore platforms, chemical plants, or pipelines exposed to high humidity or corrosive agents.

The rotatable structure includes, but is not limited to, a rotating ring, a turntable stage, a gear-driven carriage, a bearing-supported circular track, and so forth. In a preferred embodiment, the rotatable structure includes a rotatable arm 210. Embodiments of the present disclosure are intended to include or otherwise cover any type of the rotatable structure, including known related art and/or later developed technologies.

The rotatable arm 210 is configured to rotate the transmitting antenna 202a and the receiving antenna 202b around the pipe section 102. By rotating the transmitting antenna 202a and the receiving antenna 202b along the exterior surface of the pipe section 102, the system 100 acquires dielectric measurements (i.e., dielectric properties) of the multiphase fluid at multiple radial angles. In an embodiment, the rotatable arm 210 may be configured to operate in either a continuous rotation mode or an incremental (stepped) rotation mode. In the incremental rotation mode, the rotatable arm 210 may rotate the single antenna pair 202a-202b by a predefined angular step size, e.g., 10°, 15°, or 30°, pausing at each position to allow the electromagnetic wave transmission and phase shift measurement to be completed. For instance, in a 12-step scan using 30° increments, the system 100 collects the phase shift data at 12 distinct angular positions around the circumference of the pipe section 102, enabling the construction of a full 360° dielectric profile.

In an embodiment, a rotation of the rotatable arm 210 may be driven by a motor 212 that is controlled by a motor control unit 214. In an embodiment, the motor control unit 214 may be configured to receive control commands from the processing unit 112. Upon receiving the control commands, the motor control unit 214 may be configured to execute corresponding motor operations, such as activation of the motor 212, adjustment of direction of rotation of the motor 212, adjust the speed and step size of the motor 212, and so forth to control a rotational behavior of the single antenna pair 202a-202b. In an embodiment, the motor control unit 214 may be configured to operate the motor 212, which provides a necessary torque to rotate the rotatable arm 210. In certain embodiments, the motor 212 may be powered by either alternating current (AC) or direct current (DC) sources, depending on the deployment environment and system design requirements. According to embodiments of the present disclosure, the motor 212 may be, but is not limited to, a stepper motor, a closed-loop servo motor, or other suitable rotary actuators capable of delivering precise and repeatable motion.

In certain embodiments, a torque transmission system, such as a gear train, a belt drive, or a pulley system, may be used to transfer rotational motion from the motor 212 to the rotatable arm 210. This configuration ensures smooth, accurate, and repeatable mechanical motion for precise dielectric measurements across the angular cross-section of the pipe section 102.

At each angular position along the circumference of the pipe section 102, the transmitting antenna 202a is configured to emit the electromagnetic waves that propagate through the fluid medium contained within the pipe section 102. In an embodiment, the electromagnetic waves may be transmitted at the one or more operating frequencies depending on the operational mode of the system 100. In an embodiment, the system 100 utilizes dual-frequency transmission to enhance the ability to distinguish between different fluid constituents, particularly in multiphase flow conditions where the constituents such as oil, water, and gas exhibit overlapping dielectric properties at a single frequency. In an embodiment, the frequencies may be selected based on the dispersion characteristics of target fluids, with lower frequencies offering deeper penetration and higher frequencies enabling greater sensitivity to the dielectric constant.

The electromagnetic waves emitted by the transmitting antenna 202a travel through the fluid medium and interact with the dielectric properties of the fluid medium. Variations in the dielectric constant, caused by the composition and distribution of the multiphase fluid, induce the phase shift in the propagating electromagnetic wave. The receiving antenna 202b is positioned at a fixed angular offset from the transmitting antenna 202a and is aligned to receive the propagated electromagnetic wave after its interaction with the fluid medium. This fixed spatial arrangement ensures that each phase measurement corresponds to a well-defined and repeatable path through the fluid medium.

The signal received by the receiving antenna 202b is directed to the phase detector 108, which is configured to analyze the phase shift between the transmitted and received signals. The phase detector 108 is capable of simultaneously processing signals at two different frequencies, thereby enabling multi-frequency phase analysis.

In an embodiment, the electromagnetic waves that are transmitted by the transmitting antenna 202a are sourced from the electromagnetic wave generator 106 (i.e., dual frequency RF generator). In an embodiment, the electromagnetic wave generator 106 is configured to generate continuous wave or pulsed signals at two distinct frequency bands. In an embodiment, the generated signals may be routed to the transmitting antenna 202a via a switching or multiplexing circuit, depending on a desired transmission sequence. In an exemplary embodiment, the electromagnetic wave generator 106 may be digitally controlled and synchronized with the rotatable arm 210 to ensure that signal emission and phase detection are aligned with each angular position of the rotating antenna pair 202a-202b.

The phase detector 108 may be configured to transmit the phase measurements acquired at each angular step to the processing unit 112, which is configured to filter, digitize, and store the phase measurements in the memory unit 118. Based on the phase shift data collected at different angular positions, the processing unit 112 may be configured to reconstruct the dielectric profile of the fluid. This reconstructed profile may be used for real-time monitoring or stored for later analysis of the multiphase fluid composition.

In an embodiment, the processed data may be further utilized by the control unit 114, which uses the dielectric profile of the multiphase fluid to generate the control signals for the actuators, valves, or pumps located upstream or downstream of a sensing region. This feedback loop enables real-time flow optimization based on dynamic compositional changes in a gas mixture.

As an exemplary embodiment of the mechanical scanning configuration 200C illustrated in FIG. 2C, the system 100 may utilize the rotatable arm 210 that repositions the single pair of antennas 202a-202b around the circumference of the pipe section with a diameter of 10 cm. Each antenna may have a width of approximately 1.5 cm. Based on motor specifications, one complete cycle of measurements across all required angular positions may be performed in approximately 0.06 seconds. This corresponds to a maximum fluid velocity of approximately 0.25 meters per second (m/s), calculated by dividing the antenna width (1.5 cm) by the cycle duration (0.06 sec). Accordingly, this configuration 200C is suited for low-speed fluid flows, where high-resolution spatial measurements are required. The configuration 200C offers a cost-effective alternative to the electronic scanning mode by employing the mechanically rotated antenna pair 202a-202b. While the measurement speed is limited by a maximum rotational frequency of the motor 212, the system 100 achieves high spatial resolution and robust dielectric sensing capabilities. This makes it suitable for the industrial applications requiring detailed cross-sectional analysis of fast-moving gaseous mixtures without the complexity of large-scale electronic switching matrices.

Figure 3:
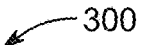
FIG. 3 illustrates a graph representing an average phase shift (Sia) measured across all pairs of transmitting antennas and receiving antennas as a function of a ratio of gas volume to total volume within a monitored region of the pipe section, according to certain embodiments.
Figure 3:
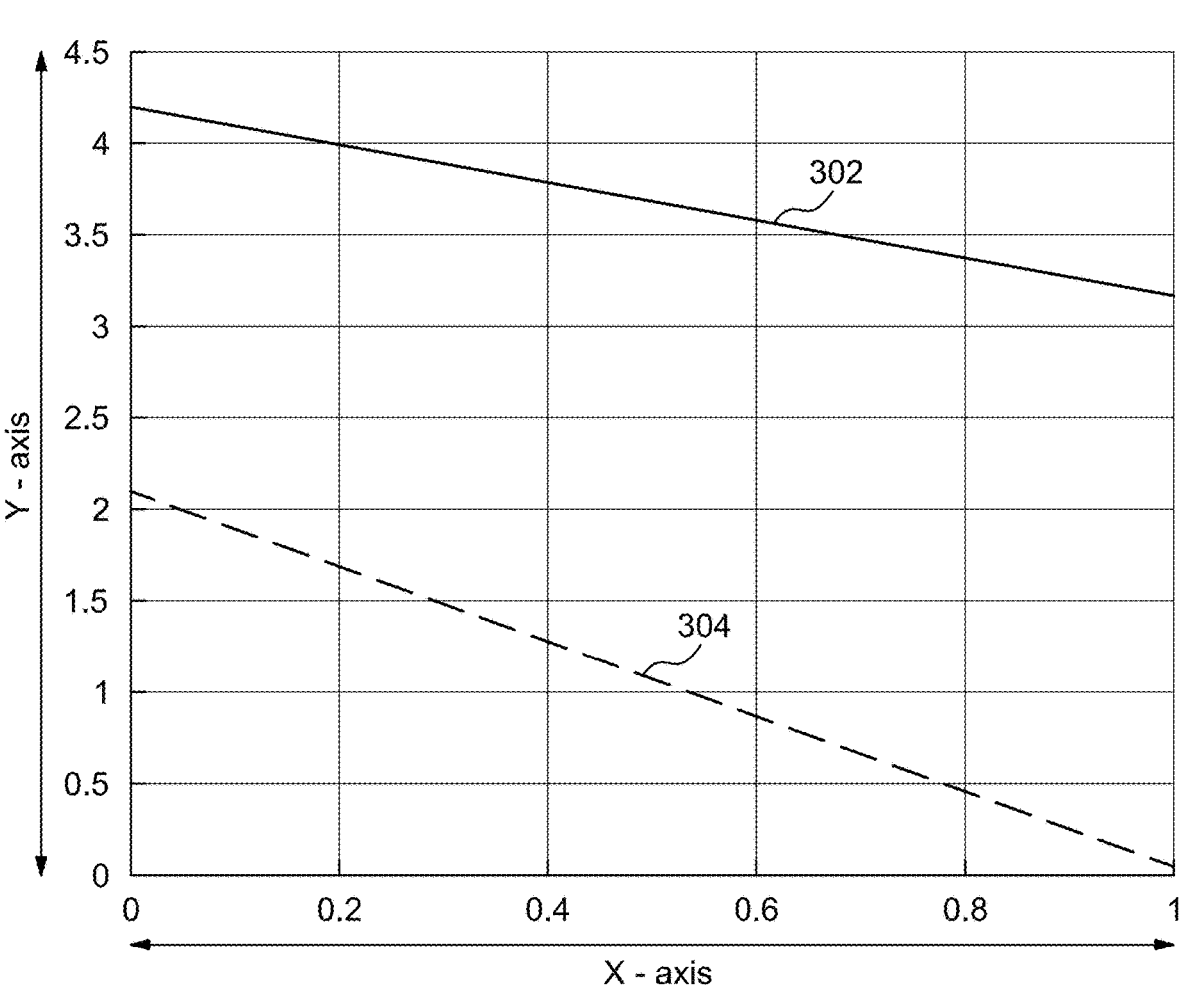

FIG. 3 illustrates a graph 300 representing an average phase shift ($S_{12}$) measured across all pairs of the transmitting antennas 104a and receiving antennas 104b as a function of a ratio of gas volume to total volume within a monitored region of the pipe section 102, according to certain embodiments. The graph 300 is derived from simulation results and presents two data sets corresponding to different operating frequencies: 10 GHz (shown as a solid line) 302 and 20 GHz (shown as a dashed line) 304.

The X-axis of the graph 300 denotes the ratio of the gas volume to the total volume, ranging from 0 to 1. A value of 0 indicates a condition where the monitored pipe section 102 is completely filled with a reference medium (i.e., no gas is present), while a value of 1 indicates that the entire pipe section 102 is filled with gas. The Y-axis represents the average phase shift ($S_{12}$ in radians), which is directly influenced by the dielectric constant of the medium between the transmitting antennas 104a and the receiving antennas 104b. A simulation study underlying FIG. 3 serves two main purposes: first, to validate the disclosed phase shift-based sensing technique for characterizing multiphase gas mixtures, and second, to demonstrate how the operating frequency impacts the sensitivity of the phase shift measurements to variations in gas concentration.

As shown in FIG. 3, at 10 GHz frequency 302, the average phase shift ($S_{12}$) decreases steadily with increasing gas content, which is expected due to a lower dielectric constant of the gas relative to other fluid phases. At 20 GHz frequency 304, a similar decreasing trend is observed; however, the slope is steeper, indicating enhanced sensitivity to dielectric variations. This frequency-dependent behavior confirms theoretical predictions that the phase shift is directly proportional to the operating frequency. Consequently, for the same change in the dielectric constant, the phase shift observed at 20 GHz frequency 304 is approximately twice that observed at the 10 GHz frequency 302, effectively doubling the sensitivity of the system 100.

The steeper decline of the 20 GHz frequency curve 304 in the graph 300 illustrates greater sensitivity to changes in the gas ratio compared to the 10 GHz frequency curve 302. This increased phase sensitivity is crucial for detecting the small variations in the dielectric constant, especially when the gas content fluctuates within a mixture. Furthermore, the simulation results demonstrate that the phase shift exhibits a linear response to the changes in the dielectric constant, in contrast to magnitude-based transmission coefficient measurements, which often show nonlinear behavior. This linearity enhances measurement precision, making phase-based methods preferable for the accurate detection of composition changes.

Moreover, the simulation supports the implementation of a dual-frequency approach that combines measurements at both the operating frequencies 10 GHz 302 and 20 GHz 304. By averaging the phase measurements obtained at two operating frequencies, 302 and 304, the system 100 benefits from approximately 3 dB noise reduction, improving the SNR. The SNR improvement enabled by dual-frequency operation is further enhanced by two key aspects of a system design. First, the dual-frequency averaging reduces the impact of uncorrelated noise between two measurement channels, leading to lower phase estimation uncertainty and higher measurement accuracy. Second, the system 100 utilizes the main lobe of the patch antennas 104 for signal reception, unlike conventional methods that rely on the side lobes. Since the main lobe is approximately 20 dB stronger than the side lobes, this corresponds to a 100× increase in signal strength, thereby significantly boosting the SNR.

These combined SNR enhancement mechanisms, such as frequency diversity and antenna gain optimization, make the system 100 well-suited for high-speed, real-time monitoring of gas mixtures in industrial settings. The enhanced SNR allows the detection of minute dielectric constant changes, which is crucial in applications such as oil and gas pipelines, chemical processing units, and high-pressure gas environments. Additionally, the higher phase shift values at the 20 GHz frequency 304 enable the detection of smaller dielectric changes, especially in fluids with dielectric constants close to that of gas (near 1), thereby enhancing the effectiveness of the system 100 in real-time monitoring of the multiphase fluid flow 206.

Figure 4:
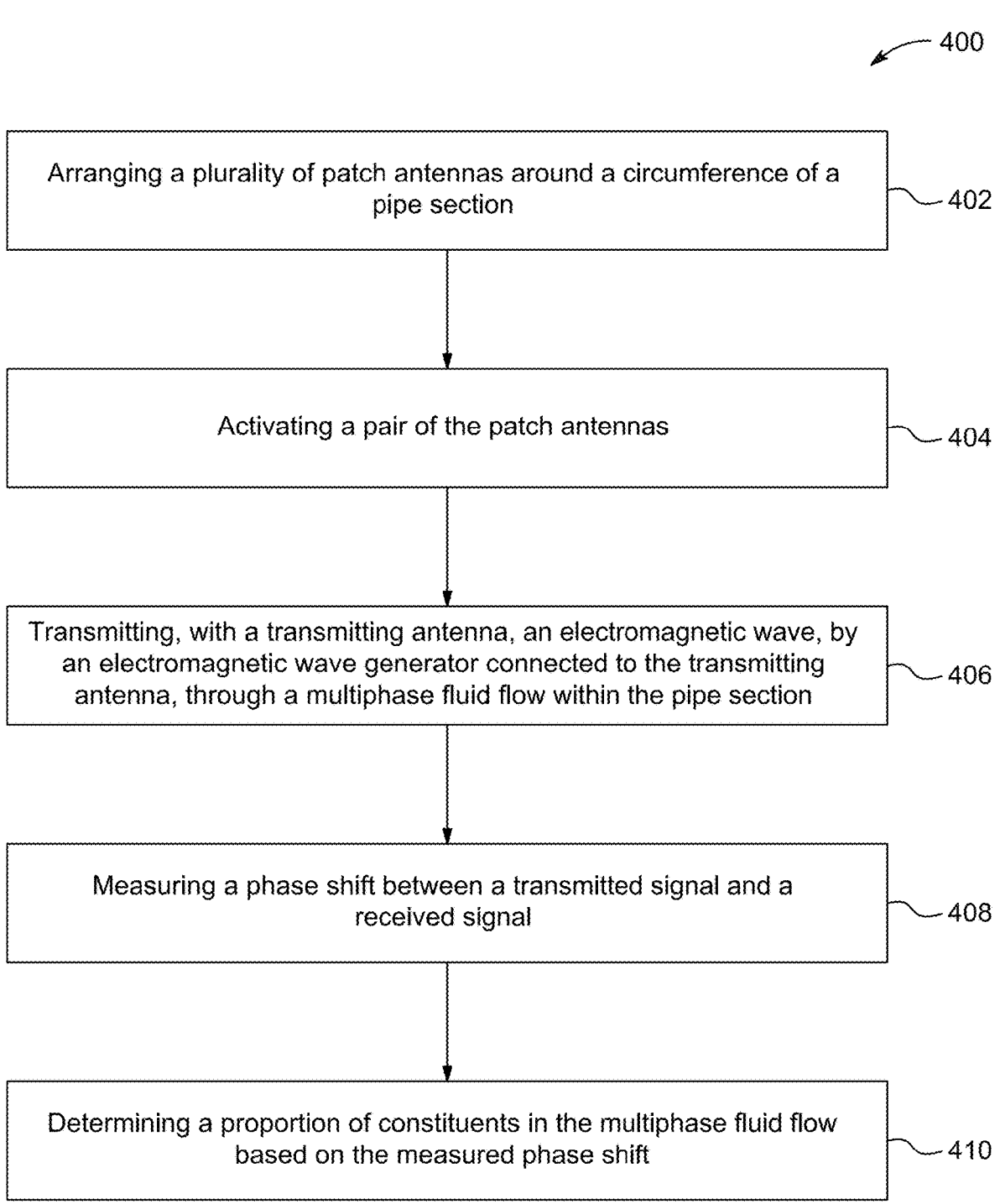
FIG. 4 illustrates a flowchart of a method for monitoring the multiphase fluid flow, according to certain embodiments.

FIG. 4 illustrates a flowchart of a method 400 for monitoring the multiphase fluid flow 206, according to certain embodiments. The method 400 includes a series of steps. These steps are only illustrative, and other alternatives may be considered where one or more steps are added, one or more steps are removed, or one or more steps are provided in a different sequence without departing from the scope of the present disclosure.

At step 402, the method 400 includes arranging a plurality of patch antennas, such as the patch antennas 104, around the circumference of the pipe section 102. In an embodiment, arranging the patch antennas 104 includes mounting the mechanical scanning mechanism 124 to the exterior surface of the pipe section 102 via the support bracket 208. This step further includes physically connecting the patch antennas 104 to the rotatable arm 210. This step further includes positioning the patch antennas 104 to move around the circumference of the pipe section 102. In an alternative embodiment, arranging the patch antennas 104 includes printing the patch antennas 104 on the flexible substrate 126 that conforms to and surrounds the exterior surface of the pipe section 102.

At step 404, the method 400 includes activating the pair of the patch antennas 104 sequentially. This step includes connecting the timing controller 122 to the electronic switching network 120 through the signal line. This step further includes configuring the timing controller 122 to regulate the measurement frequency. This step further includes operating the electronic switching network 120 to control signal routing between the patch antennas 104.

At step 406, the method 400 includes transmitting, with the transmitting antenna 104a, the electromagnetic wave, by the electromagnetic wave generator 106 connected to the transmitting antenna 104a, through the multiphase fluid flow 206 within the pipe section 102. This step also includes generating the electromagnetic waves using the electromagnetic wave generator 106. This step further includes emitting the electromagnetic waves from the subset of the patch antennas 104 functioning as the transmitting antennas 104a on one side of the pipe section 102. This step further includes allowing the electromagnetic waves to pass through the multiphase fluid within the pipe section 102. This step further includes detecting the electromagnetic waves using another subset of the patch antennas 104 functioning as the receiving antennas 104b positioned on the opposite side of the pipe section 102.

At step 408, the method 400 includes measuring the phase shift between the transmitted signal and the received signal. This step includes identifying the difference between the transmitted signal and the received signal. This step further includes calculating the phase shift value corresponding to the path through the multiphase fluid. This step further includes connecting the data acquisition module 110 to the phase detector 108. This step further includes configuring the data acquisition module 110 to capture the phase measurements at a rate corresponding to the flow velocity of multiphase fluids. This step further includes processing the captured measurements to determine the phase shift values.

At step 410, the method 400 includes determining the proportion of constituents in the multiphase fluid flow 206 based on the measured phase shift. This step includes storing the phase shift data in the memory unit 118. This step further includes correlating the measured phase shift with the stored phase shift data. This step further includes calculating the dielectric properties based on the measured phase shift. This step further includes dividing the path between the antenna pairs into discrete segments for analysis. This step further includes adjusting the fluid flow 206 based on the measured phase shift.

Figure 5:
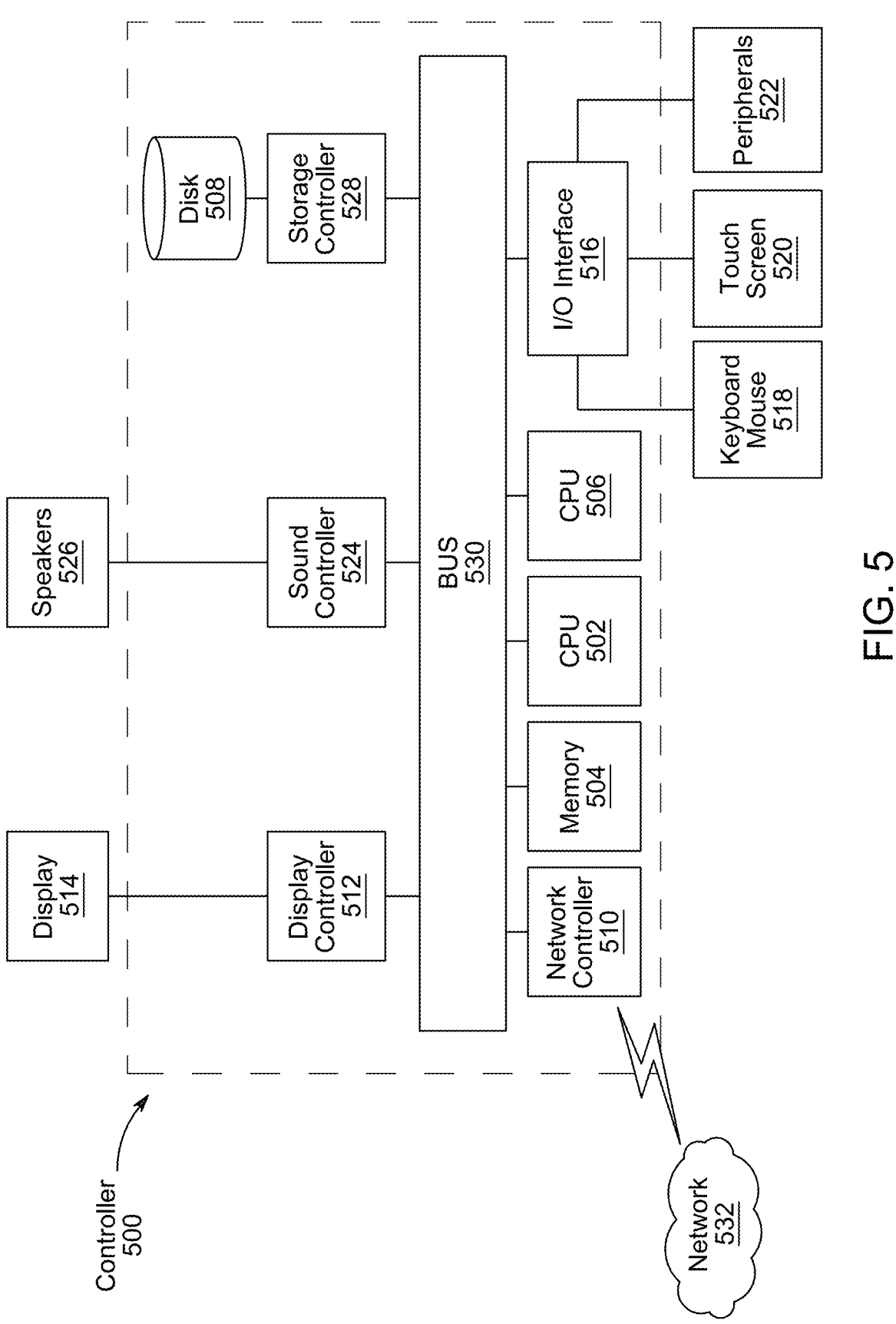
FIG. 5 is an illustration of a non-limiting example of details of computing hardware used in a computing system, according to certain embodiments.

Next, further details of the hardware description of a computing environment according to exemplary embodiments are described with reference to FIG. 5. In FIG. 5, a controller 500 is described as representative of the system 100 of FIG. 1 in which the controller 500 includes a CPU 502 which performs the processes described above/below. The process data and instructions may be stored in a memory 504. These processes and instructions may also be stored on a storage medium disk 508 such as a hard drive (HDD) or a portable storage medium or may be stored remotely.

Further, claims are not limited by the form of the computer-readable media on which the instructions of the inventive process are stored. For example, the instructions may be stored on compact discs (CDs), digital versatile disc (DVDs), in FLASH memory, read access memory (RAM), read only memory (ROM), programmable read only memory (PROM), erasable programmable read only memory (EPROM), electrically erasable programmable read only memory (EEPROM), hard disk or any other information processing device with which the computing device communicates, such as a server or computer.

Further, the claims may be provided as a utility application, background daemon, or component of an operating system, or combination thereof, executing in conjunction with CPU 502, 506 and an operating system such as Microsoft Windows 7, Microsoft Windows 10, UNiplexed Information Computing System (UNIX), Solaris, Lovable Intellect Not Using XP (LINUX), Apple Macintosh (MAC)-Operating System (OS) and other systems known to those skilled in the art.

The hardware elements in order to achieve the computing device may be realized by various circuitry elements, known to those skilled in the art. For example, CPU 502 or CPU 506 may be a Xenon or Core processor from Intel of America or an Opteron processor from advanced micro devices (AMD) of America, or may be other processor types that would be recognized by one of ordinary skill in the art. Alternatively, the CPU 502, 506 may be implemented on a field programmable Gate array (FPGA), application-specific integrated circuit (ASIC), programmable logic device (PLD) or using discrete logic circuits, as one of ordinary skill in the art would recognize. Further, CPU 502, 506 may be implemented as multiple processors cooperatively working in parallel to perform the instructions of the inventive processes described above.

The computing device in FIG. 5 also includes a network controller 510, such as an Intel Ethernet PRO network interface card from Intel Corporation of America, for interfacing with network 532. As can be appreciated, the network 532 can be a public network, such as the Internet, or a private network such as a local area network (LAN) or a wide area network (WAN) network, or any combination thereof and can also include public switched telephone network, (PSTN) or an integrated services digital network (ISDN) sub-network. The network 532 can also be wired, such as an Ethernet network, or can be wireless, such as a cellular network including EDGE, 3G and 4G wireless cellular systems. The wireless network can also be Wireless Fidelity (WiFi), Bluetooth, or any other wireless form of communication that is known.

The computing device further includes a display controller 512, such as a NVIDIA GeForce GTX or Quadro graphics adaptor from NVIDIA Corporation of America for interfacing with display 514, such as a Hewlett Packard HPL2445w LCD monitor. A general purpose I/O interface 516 interfaces with a keyboard and/or mouse 518 as well as a touch screen panel 520 on or separate from display 514. General purpose I/O interface also connects to a variety of peripherals 522 including printers and scanners, such as an OfficeJet or DeskJet from Hewlett Packard.

A sound controller 524 is also provided in the computing device such as Sound Blaster X-Fi Titanium from Creative, to interface with speakers/microphone 526 thereby providing sounds and/or music.

The general-purpose storage controller 528 connects the storage medium disk 508 with communication bus 530, which may be an instruction set architecture (ISA), extended industry standard architecture (EISA), video electronics standards association (VESA), peripheral component interconnect (PCI), or similar, for interconnecting all of the components of the computing device. A description of the general features and functionality of the display 514, keyboard and/or mouse 518, as well as the display controller 512, storage controller 528, network controller 510, sound controller 524, and general purpose I/O interface 516 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 6.

Figure 6:
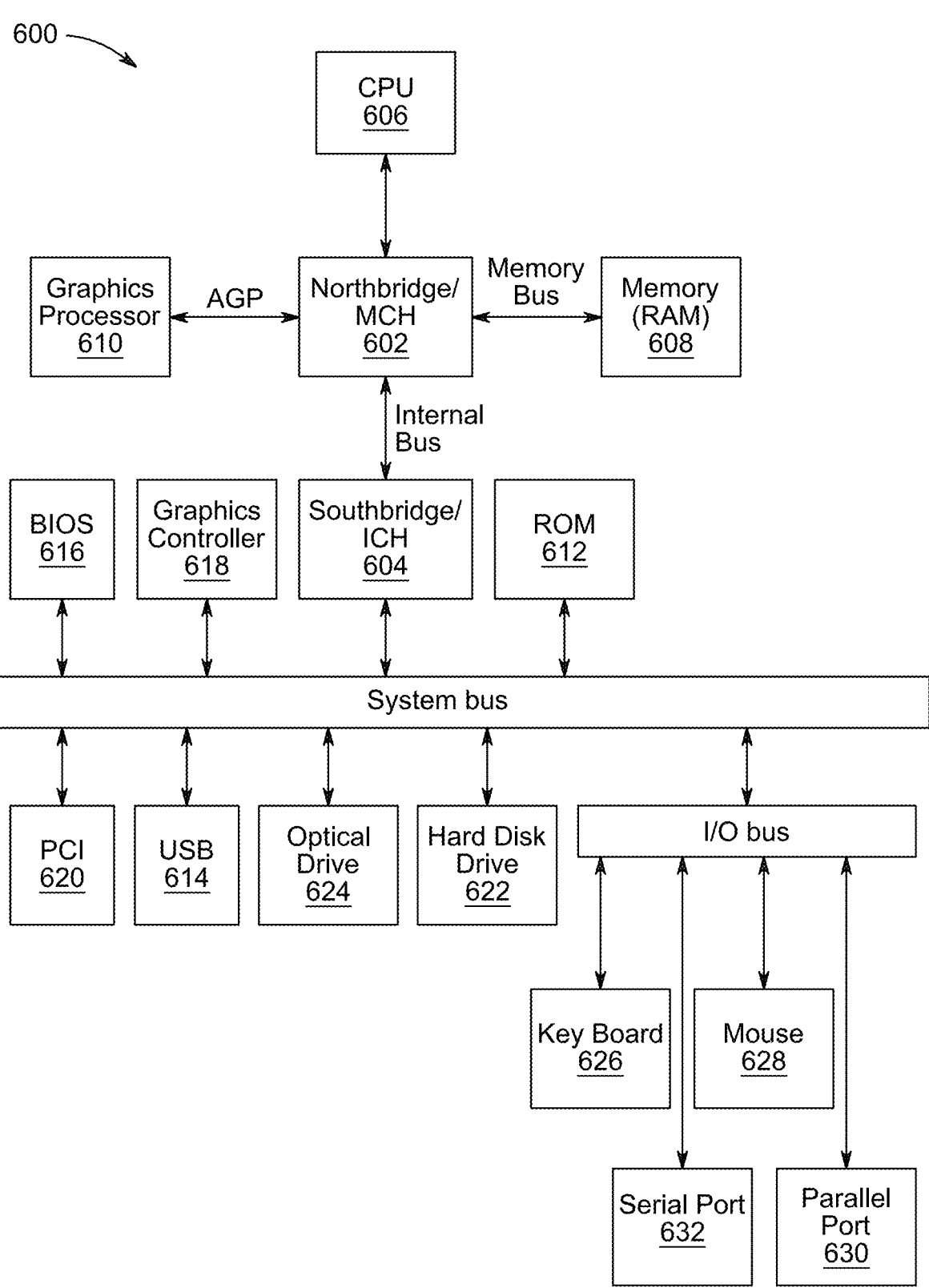
FIG. 6 is an exemplary schematic diagram of a data processing system used within the computing system, according to certain embodiments.

FIG. 6 is an exemplary schematic diagram of a data processing system 600 used within the computing system, according to certain embodiments, for performing the functions of the exemplary embodiments. The data processing system 600 is an example of a computer in which code or instructions implementing the processes of the illustrative embodiments may be located.

In FIG. 6, the data processing system 600 employs a hub architecture including a north bridge and memory controller hub (NB/MCH) 602 and a south bridge and input/output (I/O) controller hub (SB/ICH) 604. The central processing unit (CPU) 606 is connected to the NB/MCH 602. The NB/MCH 602 also connects to the memory 608 via a memory bus, and connects to the graphics processor 610 via an accelerated graphics port (AGP). The NB/MCH 602 also connects to the SB/ICH 604 via an internal bus (e.g., a unified media interface or a direct media interface). The CPU 606 may contain one or more processors and even may be implemented using one or more heterogeneous processor systems.

Figure 7:
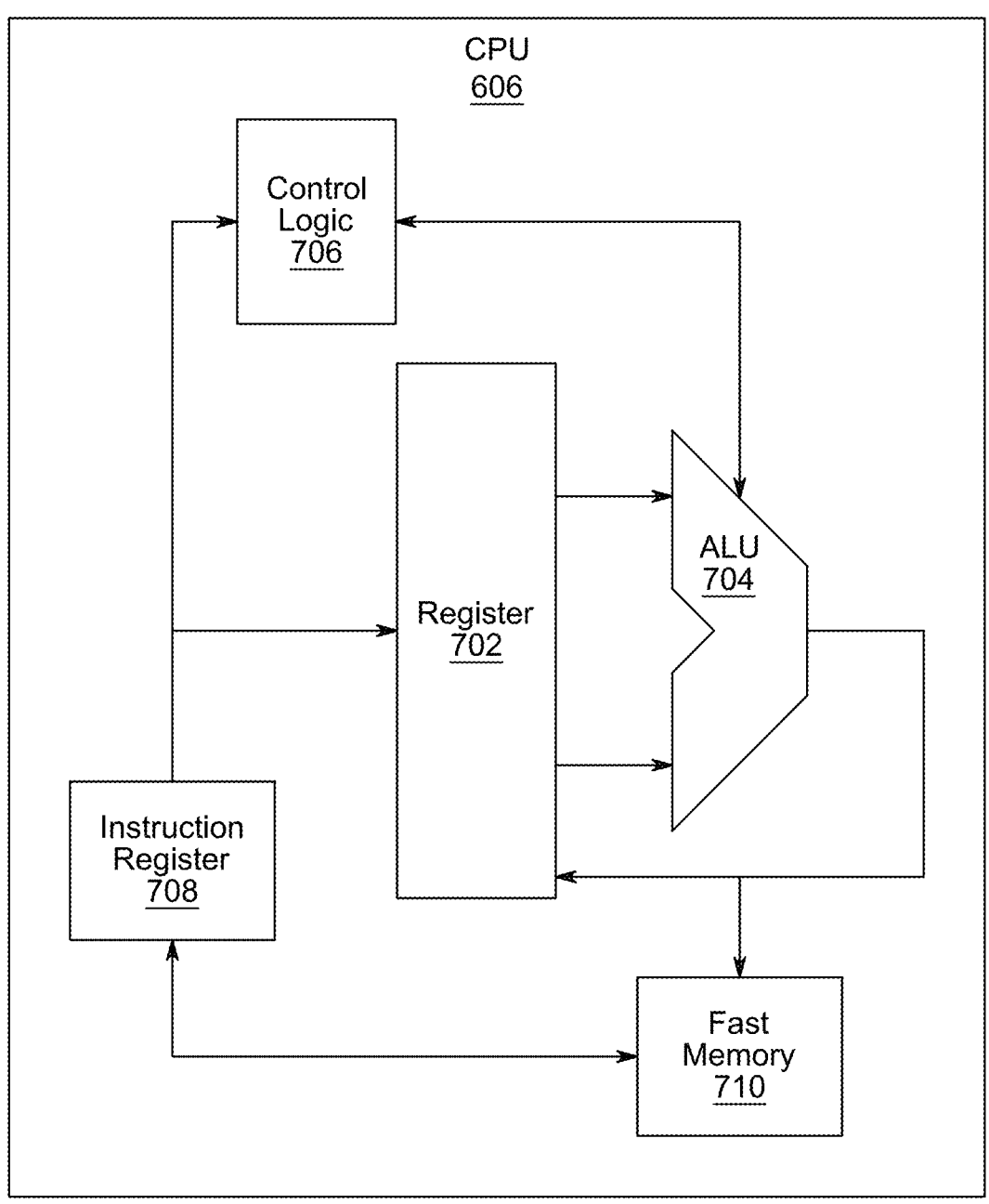
FIG. 7 is an exemplary schematic diagram of a processor used with the computing system, according to certain embodiments.

For example, FIG. 7 shows one implementation of the CPU 606. In one implementation, the instruction register 708 retrieves instructions from the fast memory 710. At least part of these instructions is fetched from the instruction register 708 by the control logic 706 and interpreted according to the instruction set architecture of the CPU 606. Part of the instructions can also be directed to the register 702. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 704 that loads values from the register 702 and performs logical and mathematical operations on the loaded values according to the instructions. The results from these operations can be feedback into the register 702 and/or stored in the fast memory 710. According to certain implementations, the instruction set architecture of the CPU 606 can use a reduced instruction set architecture, a complex instruction set architecture, a vector processor architecture, a very large instruction word architecture. Furthermore, the CPU 606 can be based on a Von Neuman model or a Harvard model. The CPU 606 can be a digital signal processor, the FPGA, the ASIC, the PLA, a PLD, or a CPLD. Further, the CPU 606 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 604 is coupled through a system bus to an I/O Bus, a read only memory (ROM) 612, universal serial bus (USB) port 614, a flash binary input/output system (BIOS) 616, and a graphics controller 618. PCI/PCIe devices can also be coupled to SB/ICH 604 through a PCI bus 620.

The PCI devices may include, for example, Ethernet adapters, add-in cards, and PC cards for notebook computers. The Hard disk drive 622 and CD-ROM (optical drive) 624 can use, for example, an integrated drive electronics (IDE) or serial advanced technology attachment (SATA) interface. In one implementation the I/O bus can include a super I/O (SIO) device.

Further, the hard disk drive (HDD) 622 and optical drive 624 can also be coupled to the SB/ICH 604 through a system bus. In one implementation, a keyboard 626, a mouse 628, a parallel port 630, and a serial port 632 can be connected to the system bus through the I/O bus. Other peripherals and devices that can be connected to the SB/ICH 604 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
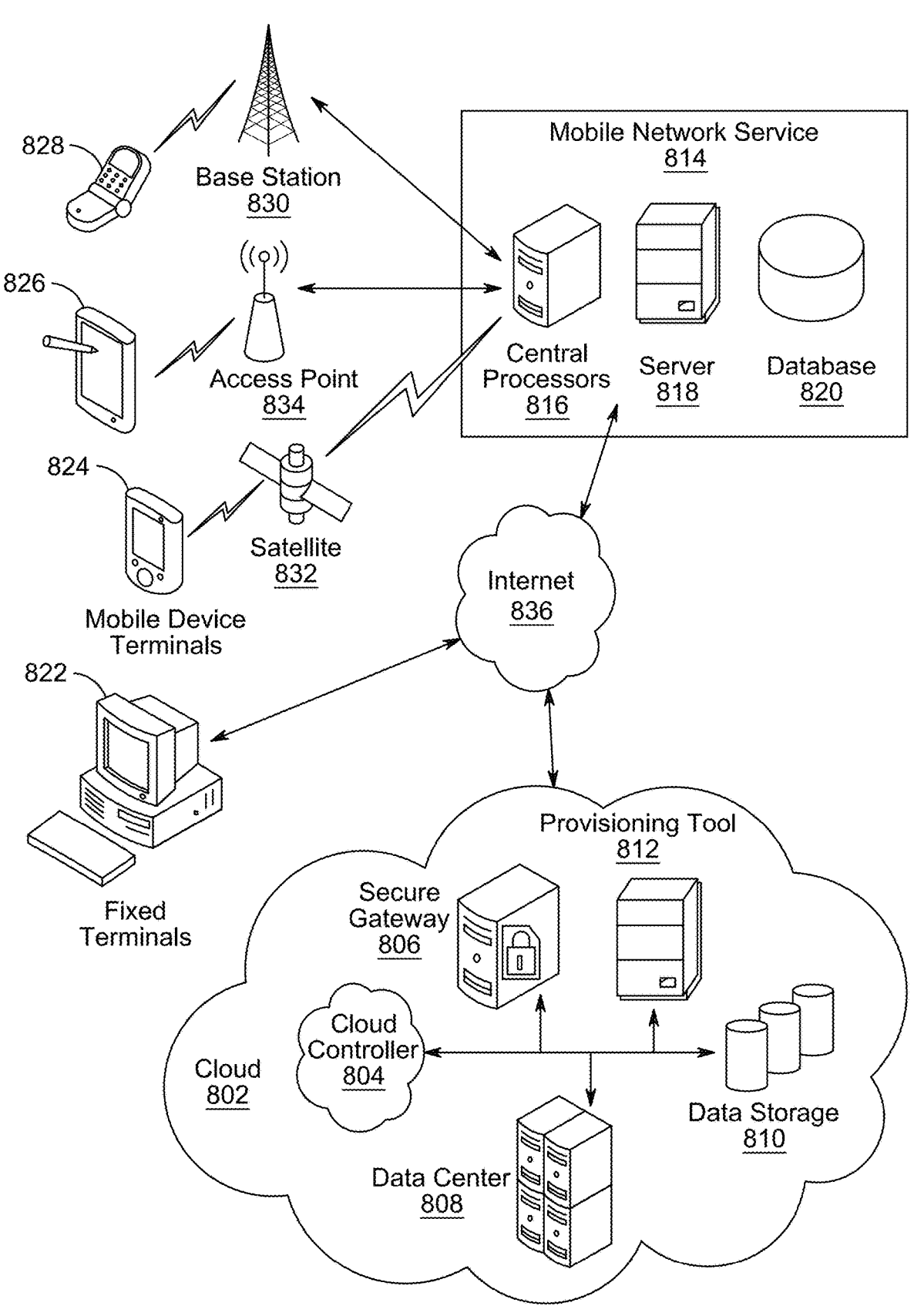
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 802 including a cloud controller 804, a secure gateway 806, a data center 808, data storage 810 and a provisioning tool 812, and mobile network services 814 including central processors 816, a server 818 and a database 820, which may share processing, as shown by FIG. 8, in addition to various human interface and communication devices (e.g., display monitors 822, smart phones 824, tablets 826, personal digital assistants (PDAs) 828). The network may be a private network, such as a base station 830, satellite 832 or access point 834, or be a public network, may such as the Internet 836. Input to the system may be received via direct user input and received remotely either in real-time or as a batch process. Additionally, some implementations may be performed on modules or hardware that are not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for monitoring multiphase fluid flow, comprising:
    a pipe section,
    a plurality of patch antennas including pairs of transmitting antennas and receiving antennas integrated on an exterior surface of the pipe section, each patch antenna having a ground plane,
    an electromagnetic wave generator connected to the patch antennas,
    a phase detector connected to the patch antennas; and
    a processing unit configured to determine a relative proportion of constituents in a multiphase fluid flowing through the pipe section based on phase shifts measured by the phase detector,
    a calibration module comprising a memory unit electrically connected to the processing unit via a data bus and configured to store reference phase shift measurements associated with individual fluid constituents.

2. The system of claim 1, wherein the patch antennas are arranged in pairs around a circumference of the pipe section, each pair comprising a transmitting antenna and a receiving antenna positioned on opposite sides of the pipe section.

3. The system of claim 1, wherein the electromagnetic wave generator is configured to produce transmitted signals comprising electromagnetic waves, wherein the transmitted signals are emitted from the transmitting antennas on one side of the pipe section and through the multiphase fluid, and wherein the phase detector is configured to detect received signals comprising the electromagnetic waves, the received signals being detected by another subset of the plurality of patch antennas functioning as the receiving antennas positioned on the opposite side of the pipe section.

4. The system of claim 1, wherein the processing unit is configured to determines a dielectric property of an individual fluid constituent in the multiphase fluid flow based on the phase shifts measured by the phase detector.

5. The system of claim 1, further comprising
    an electronic switching network electronically connected to the plurality of patch antennas and the electromagnetic wave generator, wherein the electronic switching network is configured to selectively activate different pairs of the patch antennas in sequence to obtain measurements around the entire circumference of the pipe section.

6. The system of claim 1, wherein the patch antennas are printed on a flexible substrate that surrounds the pipe section.

7. The system of claim 1, further comprising a mechanical scanning mechanism mounted to the exterior surface of the pipe section via a support bracket and electrically coupled to the processing unit, wherein the mechanical scanning mechanism is configured to rotate at least one transmitting antenna and at least one receiving antenna around the pipe section.

8. The system of claim 1, wherein the electromagnetic wave generator is configured to generate signals at two different frequencies.

9. A method for monitoring a multiphase fluid flow, comprising:

arranging a plurality of patch antennas around a circumference of a pipe section;

activating a pair of the patch antennas;

transmitting, with a transmitting antenna, an electromagnetic wave, by an electromagnetic wave generator connected to the transmitting antenna, through the multiphase fluid flow within the pipe section;

measuring a phase shift between a transmitted signal and a received signal; and determining a proportion of constituents in the multiphase fluid flow based on the measured phase shift, wherein determining the proportion of constituents in the multiphase fluid comprises:

storing phase shift data in a memory unit;

correlating the measured phase shift with the stored phase shift data;

calculating dielectric properties based on the measured phase shift;

dividing a path between antenna pairs into discrete segments for analysis; and adjusting fluid flow based on the measured phase shift.

10. The method of claim 9, wherein transmitting electromagnetic waves through multiphase fluid within the pipe section comprises:

generating the electromagnetic waves using the electromagnetic wave generator, emitting the electromagnetic waves from a subset of the patch antennas functioning as transmitting antennas on one side of the pipe section, allowing the electromagnetic waves to pass through the multiphase fluid within the pipe section, and detecting the electromagnetic waves using another subset of the patch antennas functioning as receiving antennas positioned on an opposite side of the pipe section.

11. The method of claim 9, wherein measuring the phase shift comprises:

identifying a difference between the transmitted signal and the received signal, and calculating a phase shift value corresponding to a path through the multiphase fluid.

12. The method of claim 9, wherein arranging the plurality of patch antennas comprises printing the patch antennas on a flexible substrate that conforms to and surrounds an exterior surface of the pipe section.

13. The method of claim 9, wherein activating the pair of the patch antennas is performed sequentially and comprises:

connecting a timing controller to an electronic switching network through a signal line;

configuring the timing controller to regulate measurement frequency; and operating the electronic switching network to control signal routing between the patch antennas.

14. The method of claim 9, wherein measuring the phase shift comprises:

connecting a data acquisition module to the phase detector, configuring the data acquisition module to capture phase measurements at a rate corresponding to a flow velocity of multiphase fluids; and processing the captured measurements to determine phase shift values.

* * * * *